United States Patent [19]

Semmlow et al.

[11] 3,938,190
[45] Feb. 10, 1976

[54] STORAGE AND RETRIEVAL SYSTEM FOR MAGNETIC TAPE CASSETTES

[75] Inventors: John Leonard Semmlow, Chicago, Ill.; Lawrence Stark, Berkeley, Calif.

[73] Assignee: Direct Access Corporation, Berkeley, Calif.

[22] Filed: Aug. 15, 1974

[21] Appl. No.: 497,563

[52] U.S. Cl. ............... 360/72; 360/69; 360/74; 360/92
[51] Int. Cl.² ............... G11B 15/68; G11B 23/04; G11B 15/18, 19/08
[58] Field of Search ............ 360/72, 71, 74, 92, 91, 360/69, 88; 340/172.5, 162; 353/25, 27; 35/35 C; 242/181

[56] References Cited
UNITED STATES PATENTS

| | | |
|---|---|---|
| 3,405,457 | 10/1968 | Bitzer ............... 35/35 C |
| 3,592,975 | 7/1971 | Ban ............... 360/72 |
| 3,811,625 | 5/1974 | Harford et al. ............... 360/92 |
| 3,831,197 | 8/1974 | Beach et al. ............... 360/92 |
| 3,852,818 | 12/1974 | Pyles ............... 360/92 |

*Primary Examiner*—Alfred H. Eddleman
*Attorney, Agent, or Firm*—Limbach, Limbach & Sutton

[57] ABSTRACT

A system for storing and retrieving information-bearing units or modules, such as magnetic tape cassettes, including a fixed two-dimensional storage array, a fixed processing or play station for extracting information from the units, and a movable selection mechanism, having three degrees of freedom, for retrieving individual modules from the storage area, transferring them to the processing area and then returning them to the storage area after the information contained therein has been extracted. Additionally, the system includes means for automatically sequencing a series of units, as well as a preprocessing station for cueing up individual units for intra-unit accessing.

23 Claims, 15 Drawing Figures

STORAGE AND RETRIEVAL SYSTEM FOR MAGNETIC TAPE CASSETTES

BACKGROUND OF THE INVENTION

The present invention relates to a system for storing and retrieving information bearing units or modules, and in particular to a special purpose retrieval system which provides automatic random access of a larger number of items stored in a fixed area.

There are many types and kinds of information retrieval systems presently available, each having its own advantages and disadvantages. For example, large scale computer based information retrieval systems are well known in the art (see U.S. Pat. No. 3,405,457). However, they require expensive high speed mass storage devices such as disk packs and relatively sophisticated central processes as controllers.

A number of random access retrieval mechanisms exist which bring together a processing station with a stored item, usually by moving the stored items. Many such devices use a rotating one-dimensional array of stored items (for example, slides, U.S. Pat. No. 3,510,215; microfiche, U.S. Pat. No. 3,704,451; or tape cassettes, U.S. Pat. No. 3,484,055); however, when a large number of items are to be stored, a two dimensional storage area is required. Such mechanisms use either a storage array capable of movement in two directions (U.S. Pat. No. 3,243,780) or an array moving in one dimension with moving selection mechanism (U.S. Pat. No. 3,164,059) or moving processing station (U.S. Pat. No. 2,918,656). These devices have the disadvantage of requiring considerable power to accelerate a large storage array and/or processing station, and to decelerate into a precise position required for processing. One device which attempts to overcome power requirements utilizes a continuously rotating array of items (U.S. Pat. No. 3,378,827). However, the storage array is restricted to one dimension and requires specially designed items. Another disadvantage of these devices is mechanical complexity and associated high cost.

Inexpensive random access tape cassette players exist for the home entertainment market (U.S. Pat. Nos. 3,524,949 and 3,682,483) but the number of cassettes these devices will accommodate is exceedingly limited (about 20 maximum) and preselection capabilities are extremely limited.

Electronic control of automated selection mechanisms is seen in devices related to audio entertainment such as juke boxes. Controllers incorporating memory to store selections are known (U.S. Pat. Nos. 3,511,351; 3,555,509 and 3,739,342) as well as controllers which allow multiple program options (3,541,514). Such systems, however, have limited storage capabilities and accommodate only storage of single addresses, i.e. there is no secondary addressing within an information unit.

SUMMARY OF THE INVENTION

It is therefore, a primary object of this invention to provide simple and inexpensive access to a large fixed store of information-bearing units, or other stored material.

Another object of this invention is to provide a random access retrieval system having minimum cost and size and maximum reliability. Another object of the invention is to provide an improved storage and retrieval system having a fixed, self-contained two-dimensional storage area and fixed processing station with a mechanically simple, movable selection mechanism having three degrees-of-freedoms to locate, transfer and restore information-bearing or other units under the control of a central controller.

Another object of this invention is to provide an improved retrieval system having a variable and specifiable sequencing of retrievals through the use of a small memory storage associated with the central controller.

Another object of this invention is to provide an improved storage and retrieval having a minimum of access time by providing means for cue-up of the appropriate information unit.

Another object of this invention is to provide intra-unit access by providing a fixed preprocessing station to search an information unit under control of the central controller with its prestored selection sequence.

Another object of this invention is to provide a large retrieval device which can be operated simply and easily by a human operator having a minimum of training and no special technological skills.

A further object of this invention is to provide a retrieval system providing automatic operation including special start up and shut down procedures and automatic shutoff mediated by the central controller.

Another object of this invention is to provide a retrieval system having a simple addressing scheme which allows, with only minor modifications, the use of a variety of different sized information bearing or other retrieved units.

Another object of this invention is to provide a reliable selection and retrieval mechanism by having fault detection, automatic-error correction and calibration procedures maintained by the central controller.

Another object of this invention is to provide automatic accounting of units retrieved.

In accordance with the present invention, an improved storage and retrieval system is provided which includes a fixed area for storing a plurality of information-containing units or modules, a fixed processing or play station, situated remotely from the storage area for extracting information from the modules, and a movable selection mechanism having three degrees of freedom for retrieving an individual module from the storage area, transferring it to the fixed processing station and, finally, restoring it to its designated position within the storage area after information has been extracted from it.

According to another aspect of the invention, a memory is provided remote from the storage area for storing a predetermined schedule of modules to be sequenced through the processing station. Input means, such as a keyboard, is provided for entering a series of selections to be sequenced within said memory. The selection mechanism is then automatically controlled and directed to sequentially retrieve, process and restore the stored schedule of modules.

According to yet another aspect of the present invention a fixed preprocessing station is provided, most desirably, near the processing or play station. The preprocessing station serves as a cueing up and decueing area for units about to be processed at the play station. That is, the preprocessing area serves as a location where intra-unit access can be carried out. This has the desirable effect of reducing the overall accessing time.

One particular application of the present invention is audio magnetic tape cassette storage and playback. A typical memory for this application includes a collection of 1000 audio tape cassettes stored by fixed numerical address and available by random access. The user, aided by a display panel, enters the desired sequence of addresses of audio tapes to be played. In addition to controlling selection machanism movements, a special controller is responsible for scheduling the operation of the selection mechanism preprocessing, and play stations. The control mechanism starts up the apparatus, sequences the system's components under normal operation, and at the end shuts down the apparatus after ensuring that all items have been returned to storage. Because of a unique buffering preprocessing station, there is negligible delay between successive plays. The display is continually updated and shows the address number of the currently entered informational item and the currently playing item.

Diagnostic procedures continually check the entire system for any apparent fault and a portion of the display is devoted to advising the user of any such faults which occur. A record of usage for accounting purposes or copyright obligations can be kept and be available upon request from a special part of the main information store.

The ease of human interaction is an important feature of the invention along with moderate cost so that direct access to the very large information store is compatible with employment of the device in a home entertainment situation or other applications involving general consumer usage.

DESCRIPTION OF A PREFERRED EMBODIMENT

This invention in the preferred embodiment is an information retrieval system, more specifically one designed for retrieval of digital or analog information stored on magnetic tape cartridges such as audio cassettes or cartridges, and video tape cassettes. Other applications of this invention include retrieval of general information bearing units or modules such as phonograph records, microfilm or microfiche, photographic slides, film cassettes, etc., or non-informational items such as stock selection from a warehouse.

Figure 1:
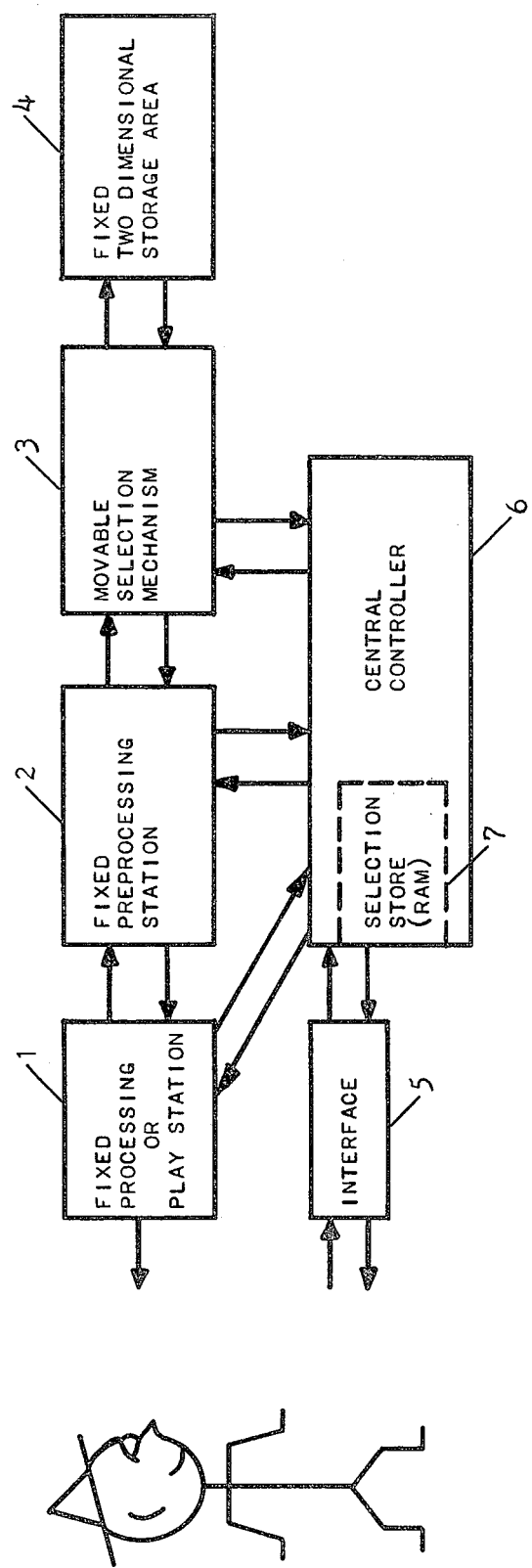
FIG. 1 is a block diagram representation of the storage and retrieval system of the present invention.

The overall organization of the storage and retrieval system of the present invention is shown in FIG. 1. Human access to stored information is through a fixed processing or play station 1. In the particular embodiment illustrated, the processing station 1 is conventionally available except modified so that its control functions, such as play forward or reverse, rewind and stop, are remotely controlled by a central controller 6. Human control of selected material is through the central controller 6 via interface unit 5. This interface unit also functions to alert the human user of the status of the retrieval unit and prompts him for appropriate address information as will be explained in greater detail subsequently.

The addresses of tape cassette units selected for retrieval by the user are stored under the direction of the central controller 6 within the selection address memory 7, a small random access memory (RAM). The central controller 6 withdraws from this selection list, in the preferred embodiment, on a first in first out basis (FIFO), an address of a tape cassette to be retrieved. The controller 6 then manipulates a movable selection mechanism 3 to fetch the proper cassette from a fixed two-dimensional storage area 4 and transfers it to the fixed preprocessing station 2. Thereafter certain cueing operations are performed, as will be described subsequently, the unit or module is transferred to the fixed play station 1. The central controller 6 is also responsible for returning the cassette to its proper storage area after use, again by appropriate manipulation of the selection mechanism 3. Details of the operation of each one of the foregoing sub-systems will be made apparent in the following description.

Figure 2:
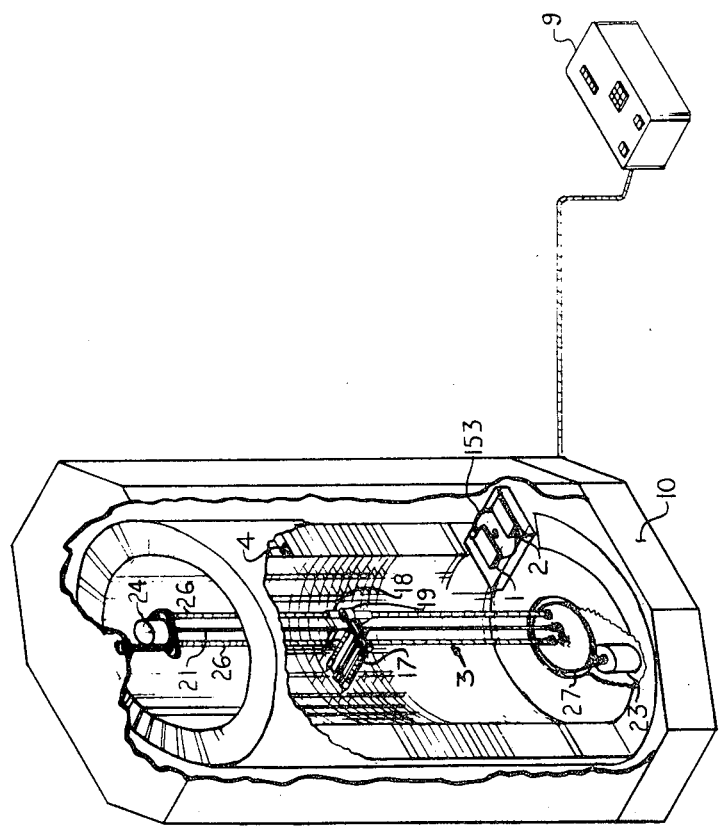
FIG. 2 is a perspective view of the mechanical arrangement of the retrieval system components schematically described in FIG. 1, including a cylindrical storage area.

FIG. 2 shows the mechanical layout of the storage retrieval system of the present invention. A base 10 supports the selection mechanism 3, the play and preprocessing stations 1, 2 and the two-dimensional fixed storage area 4. The interface unit 5 is contained remotely and separately in a housing 9 which also contains the central controller 6. The fixed storage area 4 is cylindrical in shape with, in the preferred embodiment, 20 standard cassettes 11 (FIG. 3) stored horizontally around a 2½ foot diameter ring and 50 cassettes stacked vertically allowing for storage of 1000 cassettes.

Figure 3:
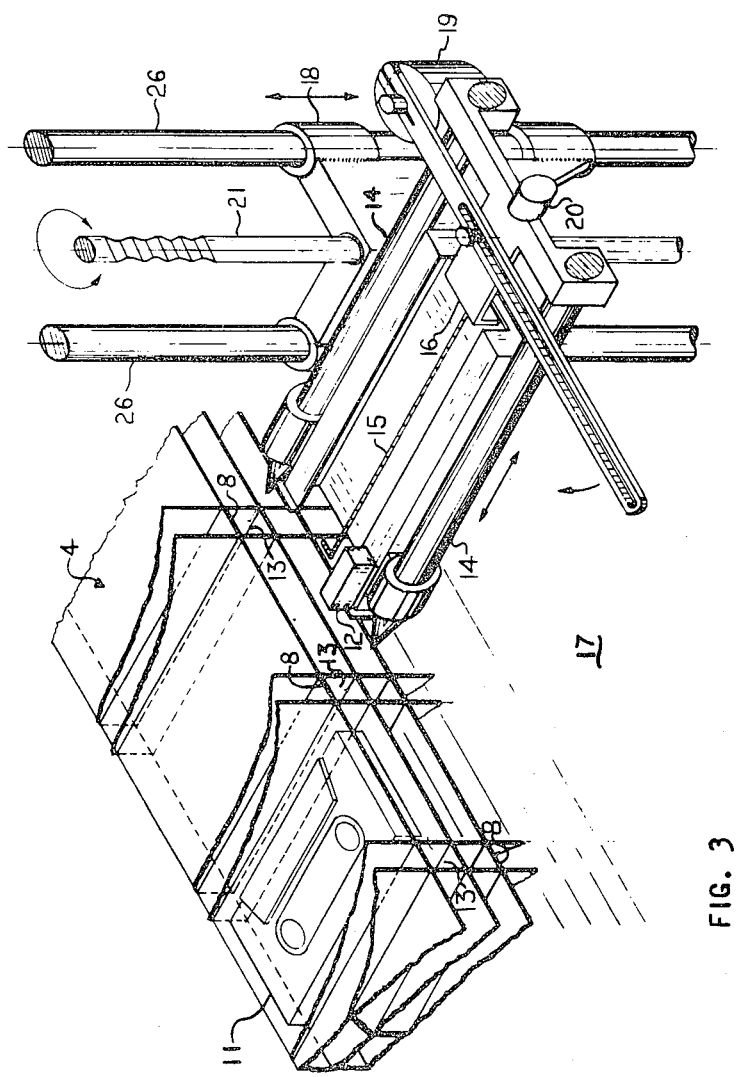
FIG. 3 is a detailed perspective view of the mechanical arrangement of the retraction/insertion mechanism of FIG. 2.

Referring additionally to FIG. 3, the selection mechanism 3 is located in the center of the cylindrical storage area 4 and consists of a remotely controllable retraction/insertion mechanism 17 mounted so as to have three degrees of freedom for holding and releasing cassettes. A small motor 19 drives the retraction mechanism 17 which consists of a push plate 16, a pull rod 15, and guide pins 14 to push the cassette into and out of the storage area 4.

The pull rod 15 is used only on retraction. The end of pull rod 15 is hooked and is used to "grab" the cassette 11 by a 90° rotation caused by retraction activator solenoid 20. For cassette insertion the push plate 16 is utilized. The guide pins 14 are movable in and out of storage area alignment holes 13 to provide self-centering. The retraction mechanism 17 is mounted on support plate 18 which is driven vertically by drive screw 21 and vertical motor 24 (FIG. 2). Rotational positioning is achieved by guide rails 26 mounted on rotating disc 27 driven by rotational motor 23. All motors are controlled by the central controller 6, as well as detailed later, for correct positioning of the retraction mechanism 17.

The preprocessing station 2 serves, in the preferred embodiment, two important functions: (1) to act as a buffer area between the selection mechanism 3 and play station 1; and (2) to search the tape for the preselected intra-cassette address. Thus, the preprocessing station 2 helps reduce the cassette access time by holding the next cassette to be played, ready for quick transfer to the fixed play station after the current cassette being played has been completed. Immediately after completion of a play, the preprocessing station 2 trades the "readied" or "cued-up" next play cassette for the cassette just played upon which, after certain operations are performed, it is returned to the storage area 4 by the selection mechanism 3.

The preprocessing station 2 provides another major advantage of this invention, the ability to select a specific intra-cassette address; that is, the selection for play of a specific song (or movement or piece) from the collection of songs normally found in a prerecorded tape cassette. While the cassette is held within the preprocessing station, it is searched for the song specified by a procedure to be detailed later. Thus, when transfer to the play station occurs, the cassette tape can be positioned to play at the preselected intra unit address.

To ensure all stored tapes are in the full rewind position, the preprocessing station 2 performs this operation on all justplayed tapes before the selection mechanism 6 returns them to the storage area 4. The processing station itself is similar to a cassette player except modified for operation only at high tape speed.

Figure 4:
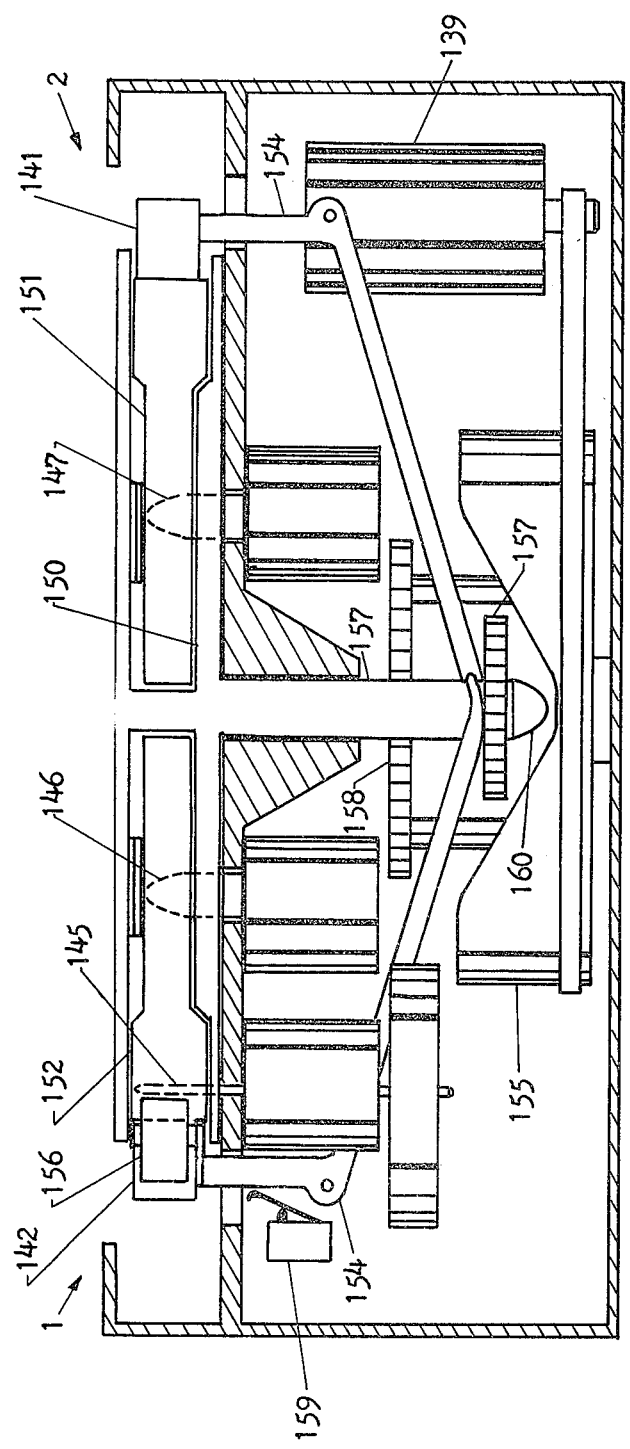
FIG. 4 is a cross-section drawing of the preprocessing/play station transfer mechanism.

Referring to FIG. 4, preprocessing play station transfer is easily achieved by a rotating support plate 150 since both stations are fixed. For each transfer the tape heads 141, 142 and play pinch roller 156 are first withdrawn by retraction bars 154 as lifting cam 155 driven by motor 139 raises the support plate 150 through the support plate cam follower 160. After the support plate 150 is sufficiently high so that the cassettes 151, 152 clear capstan 145, take up 146, and rewind 147 drive shafts the lifting cam drive gear 158 engages the support plate pinion 157 to rotate the support plate 150 by 180° after which the lifting cam 155 lowers the support plate 150 disengaging the support plate pinion 157 and causing the heads to be repositioned via retraction bars 154. This final action releases a play cue transfer cycle switch 159 to send a "step complete" signal to the preprocessing peripheral controller 66 (FIG. 7) and on to the central controller 6. Thus, as the readied next play cassette 151 moves to the play station 1, the just played cassette 152 is transferred to the preprocessing station 2 for decueing (rewind).

Alternatively, another embodiment of this invention uses the selection mechanism 3 with a temporary holding bin to achieve preprocessing-play station transfer without the need for special transfer means. In still another form, multiple play and/or record stations (2 or more) can be used in the processing area, and the selection mechanism would load these directly. In such an embodiment, the functions of cueing and decueing, if necessary, take place at the play/record stations, and automated or semi-automated transfer of information between files in the storage area 4 can be carried out.

In order to aid human access to stored material a simple library of available cassettes, their storage addresses, and their contents is maintained. Establishment and expansion of this library is easily handled by taking advantage of industry convention in prerecorded tapes. With each prerecorded cassette a label of standard size is supplied which includes information on cassette title and contents. A label organizer, a small booklet which contains 1000 numerical sequenced pockets of a size to nearly contain the standard cassette tape label is utilized. The pockets are covered in a clear plastic so the titles and contents with their associated storage addresses are available at a glance.

Figure 5:
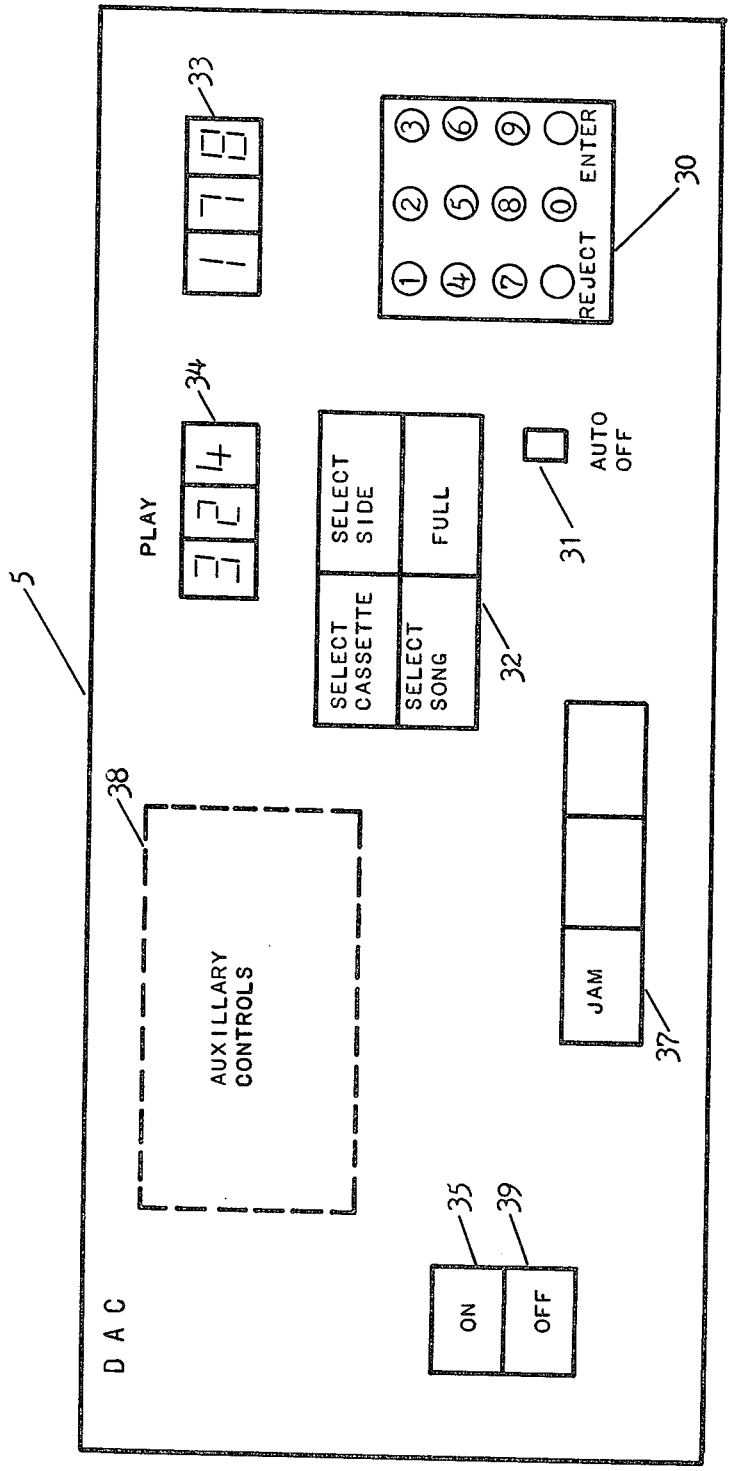
FIG. 5 is a plan view of the interface control console.

FIG. 5 is a detail of the interface unit 5 which functions as a control console for the storage and retrieval system. Addresses of cassettes to be retrieved are entered via the entry keyboard 30 with the present entry shown on numerical display 33. In general, a retrieval address can have up to three parts: (1) a cassette number; (2) a side number; and (3) an intra-cassette selection number; and the user is prompted for the appropriate entry via the prompting lites 32. The cassette number currently being played is shown in the play numerical display 34. The interface unit provides other control features including alarm indicators 37, on-off switches 35 and 39, auto-off mode selector 31, and controls associated with the audio playback system 38.

Figure 6:
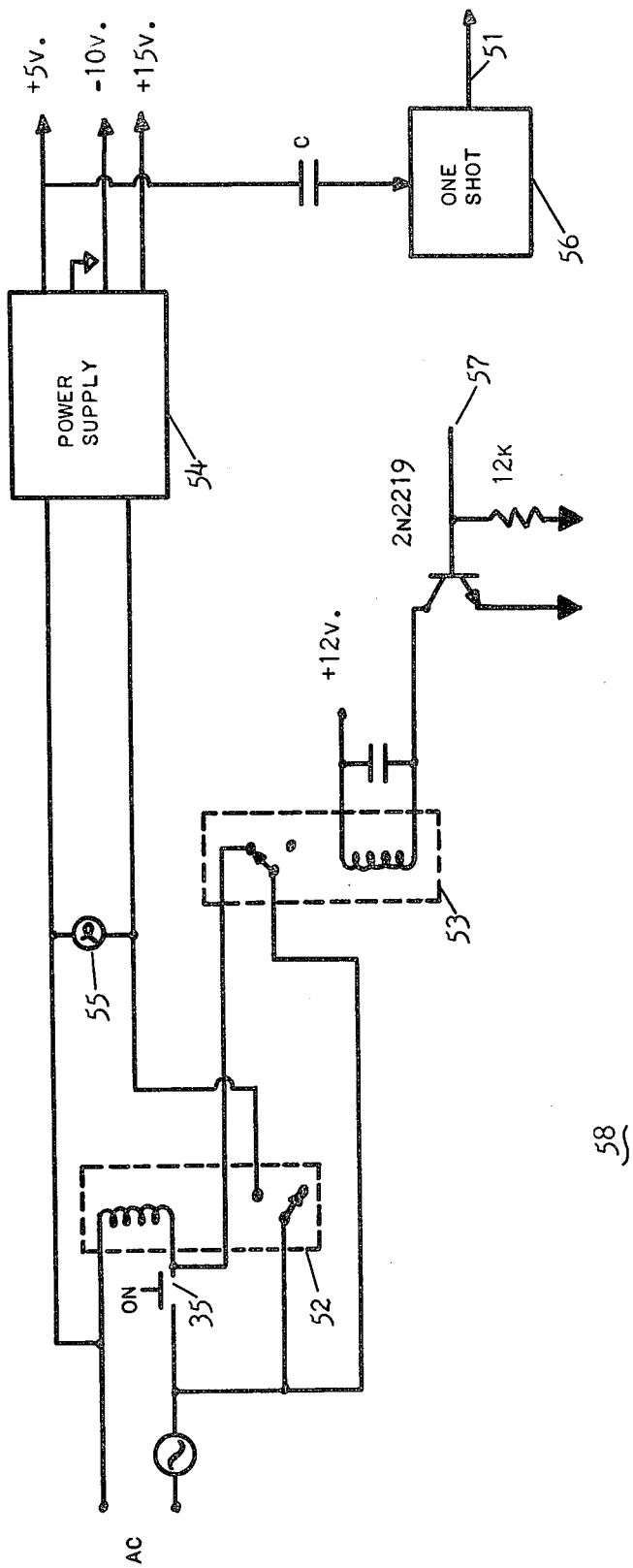
FIG. 6 is a schematic diagram of the system power supply circuitry.

The entire system is powered by the power supply and control 58 shown in FIG. 6. Activation of the "power-on" switch 35 causes the power relay 52 to close and remains closed due to a latching circuit through the shut-down relay 53. The power relay supplies switched AC power to a pilot lite 55 and to the power supply module 54 which in turn produces the various DC voltages required by system electronic components.

Output from the power supply 54 is also capacitively coupled to the "power-clear" one-shot multivibrator 56 to generate a initializing reset pulse over powerclear line 51 and is used by the entire system upon start up. The latched power relay 52 can be opened under normal operation only by interruption of the latching pathway through the closure of the shut-down relay 53. This relay is activated under direct control of the central processor over line 57 and thus only the central processor can shut off the system.

Figure 7:
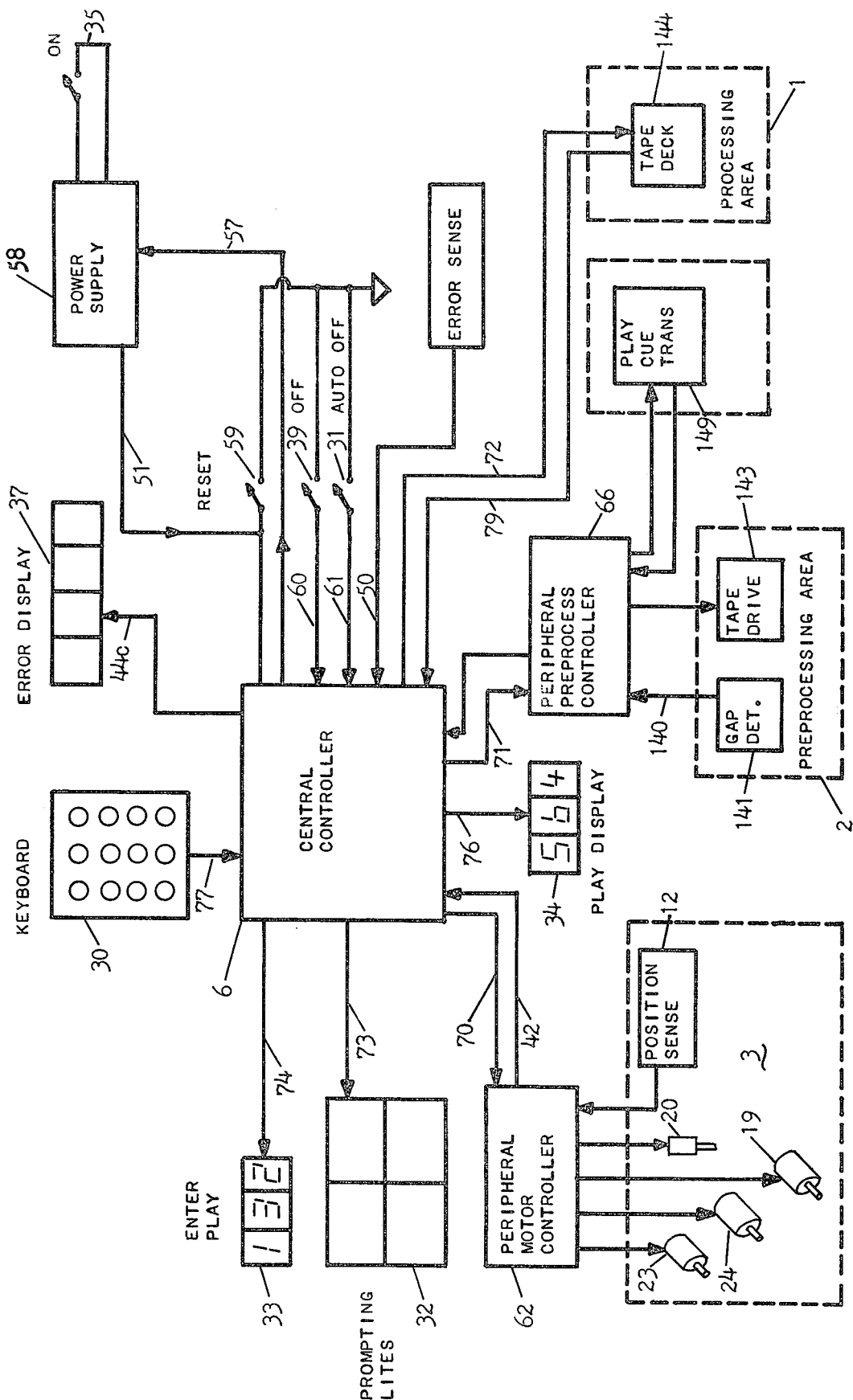
FIG. 7 is a block diagram showing the relationship between the central controller and the surrounding controlled sub-systems.

The relationship of the central controller to the various peripheral sub-systems previously described is shown in FIG. 7. The peripheral devices are all either commercially available or are common assemblies well known to those in the art. The electrical components of each device along with examples of possible model numbers are given in the following Table 1, or in the case of the peripheral processors, are described later.

Table 1

| Device Name | Parts |
| --- | --- |
| Keyboard 30 | 1 std. keyboard (Alco CR-015) |
| Enter Display 33 | 3 seven segment display readouts |
| | 3 BCD-seven segment decoder drivers (MC 7447) |
| Play Display 34 | Same as Enter Display |
| Prompting Display 32 | 4 std. 6 volt lites |
| | 1 hex driver |
| Tape Players 144 | 1 automatic cassette player (Creig) |
| Preprocessing Peri- | Later described, see FIG. 13 |

Table 1-continued

| Device Name | Parts |
|---|---|
| pheral Controller 66 | |
| Peripheral Motor Controller and Selection Mechanism 62 | Later described, see FIG. 12 |

Figure 8:
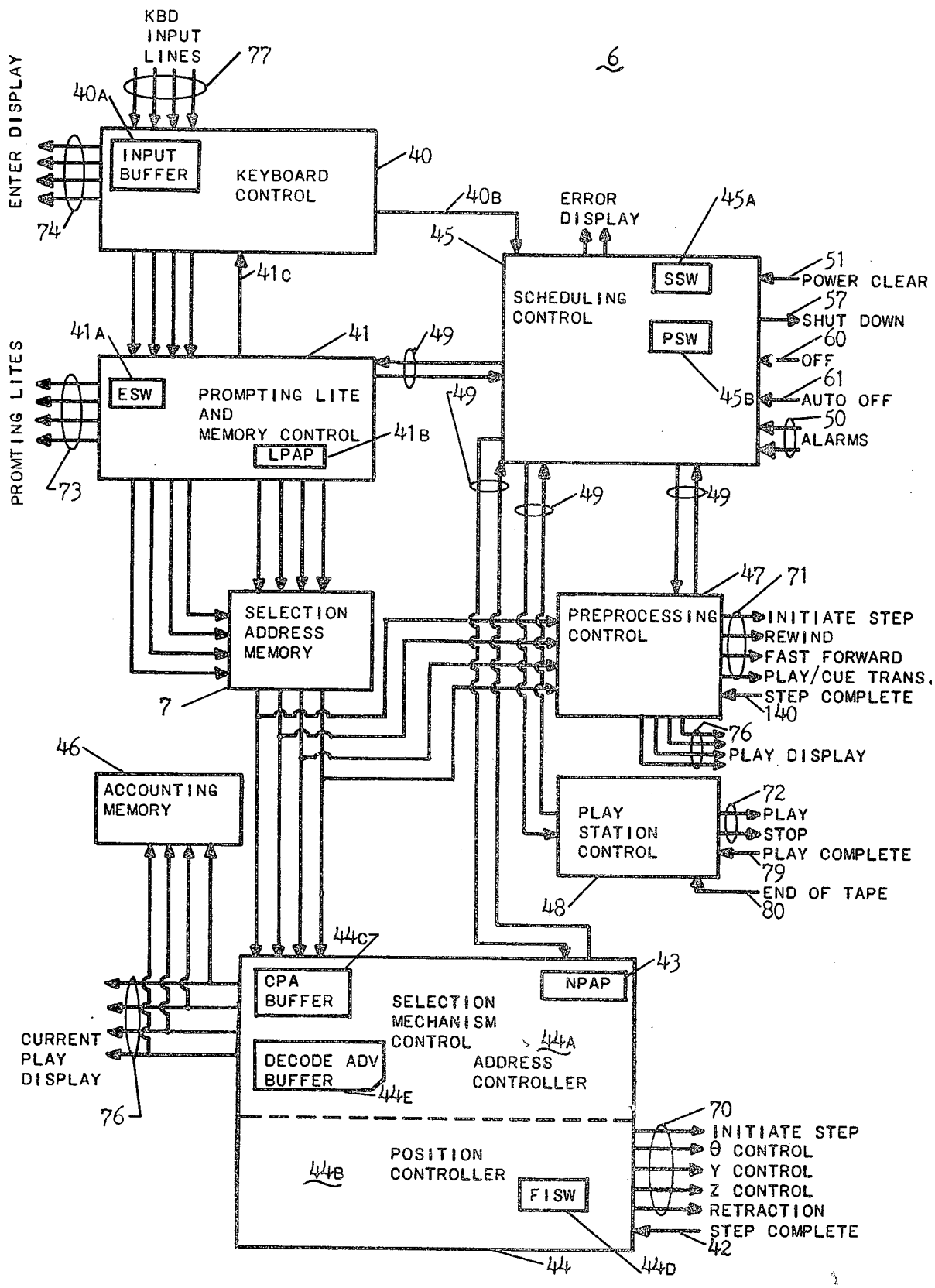
FIG. 8 is a block diagram representation of the central controller and its control functions.

The central controller 6 is a major feature of this invention and its operation is shown diagrammatically in FIG. 8. Implementation of the operational features of this special processor can be accomplished with standard hard-wired logic circuitry well known in the art, or, as in the preferred embodiment, with a small digital computer (microcomputer), along with an output multiplexor of standard design to increase the number of available output control lines. Each major function of the central processor 6 is handled by a particular subsection. The major functions performed by this unit and the subsection to perform these functions include:

a. Overall scheduling of system operation sequencing selection mechanism 6, preprocessing 2, and play station 1 operation is provided by the scheduling controller 45.

b. Detailed control of selection mechanism 6 sending appropriate signals to the rotational, vertical, retraction mechanism advance motors 23, 24, 19, and the retraction activation solenoid 20 including obtaining and decoding the next play address is provided by the selection mechanism controller 44.

c. Detailed control of preprocessing and play stations is provided by the preprocessing and play station controllers 47 and 48, respectively.

d. Address inputs from the keyboard 30 including entry display is provided by the keyboard interface 40.

e. Address storage in the sequence selection memory 7 prompting lite control is provided by the memory and prompting lite control 41.

f. Fault detection and automatic start up and shut down procedure is provided by the scheduling control 45.

g. Accounting of units retrieved through a second internal memory 46.

The overall operation of the storage and retrieval system of the present invention will now be described. As discussed above, many of the following operational activities are carried out under the direction of the central controller 6 which, in turn, itself is programmed to direct the system operation. The computer software listing for one actual embodiment of the invention is given in Table 2 at the end of this specification. The following description of the operation of the system is keyed to this computer listing, by use of the symbol cc followed by the applicable computer listing line numbers.

Automatic Start [CC100–CC119]

To start up the system, power-on switch 35 is closed and the central controller 6 receives a reset pulse on power-clear line 51 from the power-clear one-shot multivibrator 56 located in the power supply area (FIG. 6). This pulse is used to initialize the processor, clearing the selection address memory 7, resetting the scheduling control 45 and clearing numerical displays and other registers. Since the selection address memory 7 is initially empty, the scheduling control does not initiate the retrieval of a cassette as will be detailed later, but as throughout systems operation, checks the keyboard 30 for a depressed key.

Keyboard Entry (d) [CC120–CC199]
[CC275–CC299]

Once a depressed key is detected over keyboard input lines 77, the keyboard interface 40 decodes it and, if it is a number, places it in an internal input buffer 40A (cleared initially) and display the contents of the input buffer 40A on the entry numerical display 33. Detection of any additional numbers causes the keyboard interface 40 to shift the contents of the input buffer 40A left one decimal place and store the new number in the vacated right most position. The new number so formed is then displayed on the entry numerical display 33. When the "enter" key is depressed the contents of the input buffer 40A are transferred to the memory and prompting lite control 41 and both the input buffer 40A and numerical display 33 are cleared.

In general, each retrieval address is composed of three parts; a cassette address, and two intra-unit addresses: the side selected and song selection. The keyboard interface 40 also tests for erroneous entries such as multiple keys and performs the "debouncing" operation to eliminate false entries.

Prompting Lights (d) [CC200–CC219, CC270–CC274]

The memory and prompting lite control 41 uses an internal register, the enter status register 41A, to keep track of which part of the address is currently being entered and informs or prompts the user by liting the appropriate message on the prompting lites 32 via control lines 73.

Sequence Selection Memory (e) [CC220–CC269]

After the memory and prompting lite control 41 obtains the complete address, the address is stored in the appropriate selection address memory 7 location as determined from the last play address register 41B, and the memory is checked to see if the memory is "full". If so, the appropriate prompting lite is displayed advising the user of this condition, and the keyboard 30 is inhibited via keyboard inhibit line 41C until memory status returns to the "not full" condition. The other non-numerical keyboard input is the "reject" entry which causes the current play to be rejected by simulating a "play complete" signal directly from the keyboard interface 40 to the sequencing subsection 45 over reject line 40B.

Sequence Control (a) [CC300–CC499]

Scheduling of system operations is the responsibility of the sequence of scheduling control subsection 45. Sequencing decisions are based on the current activity of each device under control of the sequencing control and other inputs, such as off or alarm signals, through the use of two status registers: the system status word (SSW) 45A, and the play status word (PSW) 45B. The systems status word 45A keeps track of the particular operation being performed through a coding scheme detailed in Table 3 below.

Table 3

| OPERATION | SYSTEM STATUS WORD CODE CODE NUMBER |
|---|---|
| Fetch Required | 0 |

Table 3-continued

| OPERATION | SYSTEM STATUS WORD CODE CODE NUMBER |
|---|---|
| Fetch in Progress | 1 |
| Cue Required | 2 |
| Cue in Progress | 3 |
| Play-Preprocessing Required | 4 |
| Play-Preprocessing in Progress | 5 |
| Start-Required | 6 |
| Decue Required | 7 |
| Decue in Progress | 8 |
| Restore Required | 9 |
| Restore in Progress | 10 |
| Restore Complete | 11 |

Generally, the initiation of an operation increments the SSW 45A (setting it to an "in progress" mode) while the completion of a process, sensed by the scheduling control over input line 49, again increments the SSW 45A to indicate the next process should be initiated.

The play status word 45B is coded on a bit by bit bases since it must indicate several different independent functions. Thus, in addition to indicating play status, the PSW 45B also indicates if an initial or final cycle is in progress, and whether or not a new cassette is required for the next play. The coding of the PSW 45B is shown in Table 4 below.

Table 4

| PLAY STATUS WORD CODE | |
|---|---|
| INDICATION | BIT SETTING |
| First Cycle In Progress | Bit 0 (MSB) = 1 |
| Last Cycle in Progress | Bit 1 = 1 |
| Same Cassette for Next Play | Bit 2 = 1 |
| New Cassette for Next Play | Bit 2 = 0 |
| Play Station Active | Bit 3 (LSB) = 1 |
| Play Station Idle | Bit 3 = 0 |

Figure 9A:
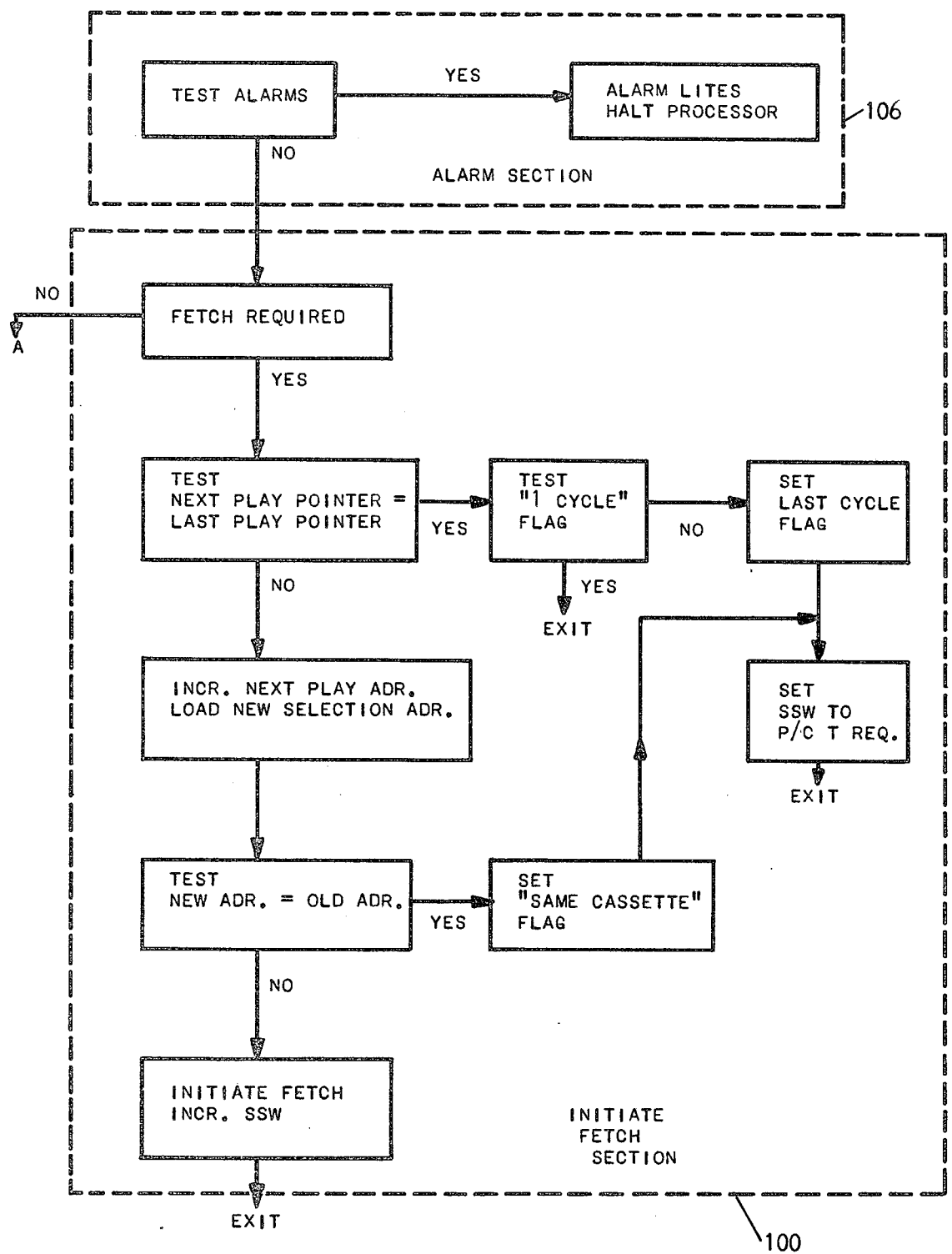
FIG. 9A–9C is a flow diagram of the logical operations performed by the sequence control of FIG. 8.
Figure 9B:
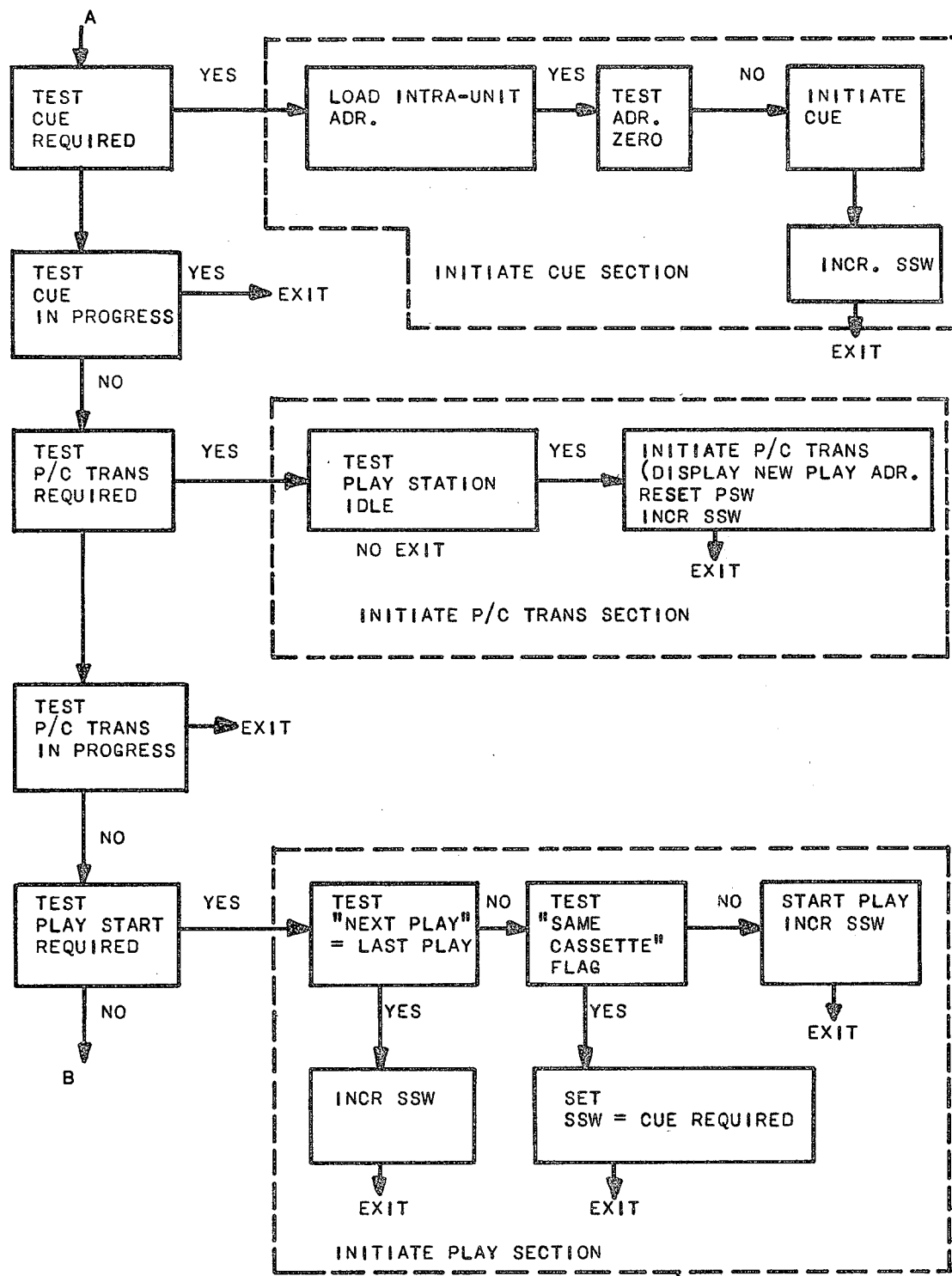
Figure 9C:
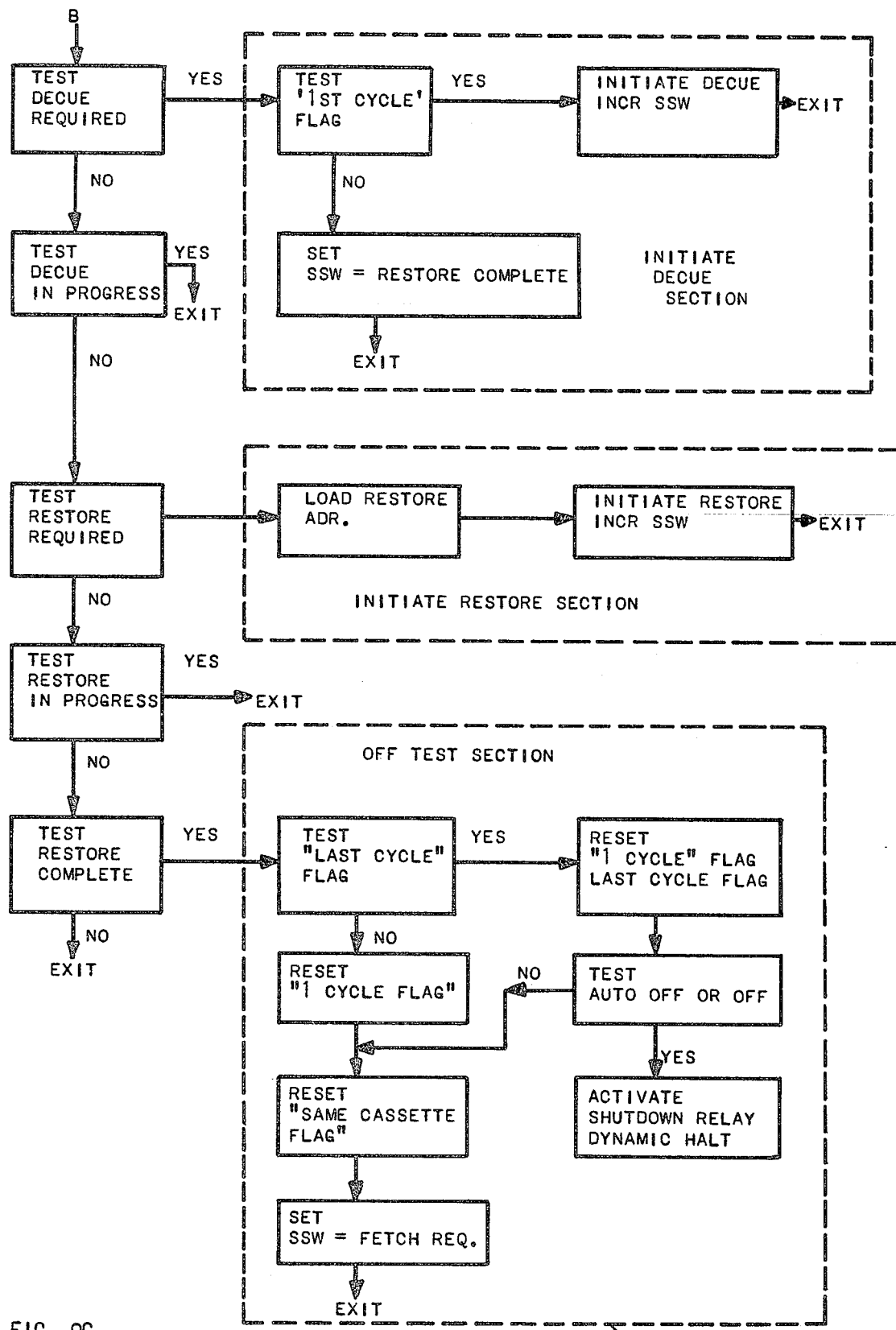

The detailed functioning of the scheduling control is shown in FIGS. 9A, 9B and 9C. The first operation is a check by alarm section 106 for an error condition. Errors such as cassette jams and control failures are sensed by remotely located devices, mechanical switches, and sent to the sequence controller 45 over special signal lines 50. An error detected forces the sequence control 45 to branch to a special error sequence which determined the nature of the error. A failure or other error such as a jam usually calls for user interaction. The sequence controller 45 activates the appropriate error message on error display lites 37 and suspends further operations until the error reset switch 59 is activated by the user which reinitialized the system in a manner similar to the start up sequence.

As shown in FIG. 9, the scheduling of operations proceeds, in general, in the sequence presented in Table 3. Several contingencies alter the scheduling sequence; most frequently when a play-cue transfer is deferred in the initiate play/cue transfer section 100 due to a currently active play station, as indicated by the PSW 45B. When cassette play is conplete a play complete signal is sent to the scheduling control 45 on line 79 resetting the PSW 45B and the sequence continues as stated.

Another alteration occurs if the new selection address is the same as the last selection address as occurs when two sequential selections reference the same cassette, but with different intra-unit addresses. This condition detected in the initiate fetch section 100 causes the "same cassette" flag in the PSW 45B to be set and the normal fetch and cue sections to be skipped. The same cassette flag is tested in the initiate play section 103 and if set, play start is deferred and the scheduling sequence is modified by setting the SSW 45A to "cue required".

Special sequencing must occur during start up and shut down operations. Sequence alterations in these two operations are handled in the initiate fetch and off test sections 100 and 107, the two end points of the normal sequence. Both operations are indicated by the condition: last play pointer 43 equals next play pointer 41B, as occurs when no selections have been made or all selections have been played. The former case, as indicated by the "1st cycle" flag of the PSW 45B, causes normal sequencing to be aborted in the initiate fetch section 100. The 1st cycle flag is also used to skip restore operations in the initial sequence cycle and is reset in the off test section 107. If the 1st cycle flag is not set, the latter condition is indicated and the initiate fetch section 100 sets the "last cycle" flag of the PSW 45B. The fetch and cue operations are again skipped as in the play start operation.

The last cycle flag is used in the off-test section 107 to indicate appropriate device conditions for systems shutdown if the auto-off or off switch line 60, 61 are active. If neither of these lines are active the last cycle flag is reset and the 1st cycle flag is set to reinitialize the scheduling sequence. If a shutdown is indicated, the scheduling controller 6 activates the shut-down relay 53 over control line 57 and the special processor halts.

Manual 'Off' Operation

Depression of the off switch 39 causes a "reject play" to occur by forcing a play complete signal on sense line 79, and sends an off signal to the special controller 6 over line 60. The off signal causes the next play pointer 43 to be set to the last play pointer 41B simulating a selection address memory 7 "empty" condition. This condition causes the scheduling control to enter a "last cycle" condition as described above, and the detection of the off signal in the off-test section 107 of the scheduling sequence will cause a system shutdown as described above. Essentially a manual off command combines a reject, selection address empty condition, and auto-off to force the same sequence which would occur in a normal auto-off operation.

Selection Mechanism Control (b) [CC350–CC399, CC450–CC479, CC550–CC699] and Peripheral Motor Control The selection mechanism controller 44 subsection of the special controller is responsible in conjunction with the peripheral motor controller 62, for sequencing commands to each of the three selection mechanism motors 19, 23 and 24 and the solenoid 20 which activates the retraction mechanism 17. This subsection is composed of an address decoder 44A containing the next-play address pointer 43, decode address buffer 44E and current-play address buffer 44C which receives from the selection memory 7 under control of the scheduling control 45 that part of the selection address which refers to the cassette storage location; and position controller 44B which receives from the scheduling control 45 the directive that a fetch or restore operation is to be initiated. Preceeding a fetch, the next play address is loaded into the decode address buffer 44E for decoding. A play-cue transfer causes the contents of decode address buffer 44E and current play address buffer 44C to switch so the just played cassette address can be decoded for a restore operation. The new contents of the current play address buffer is then sent to the current play display 34 over control lines 76 and to the accounting memory 46.

Figure 10:
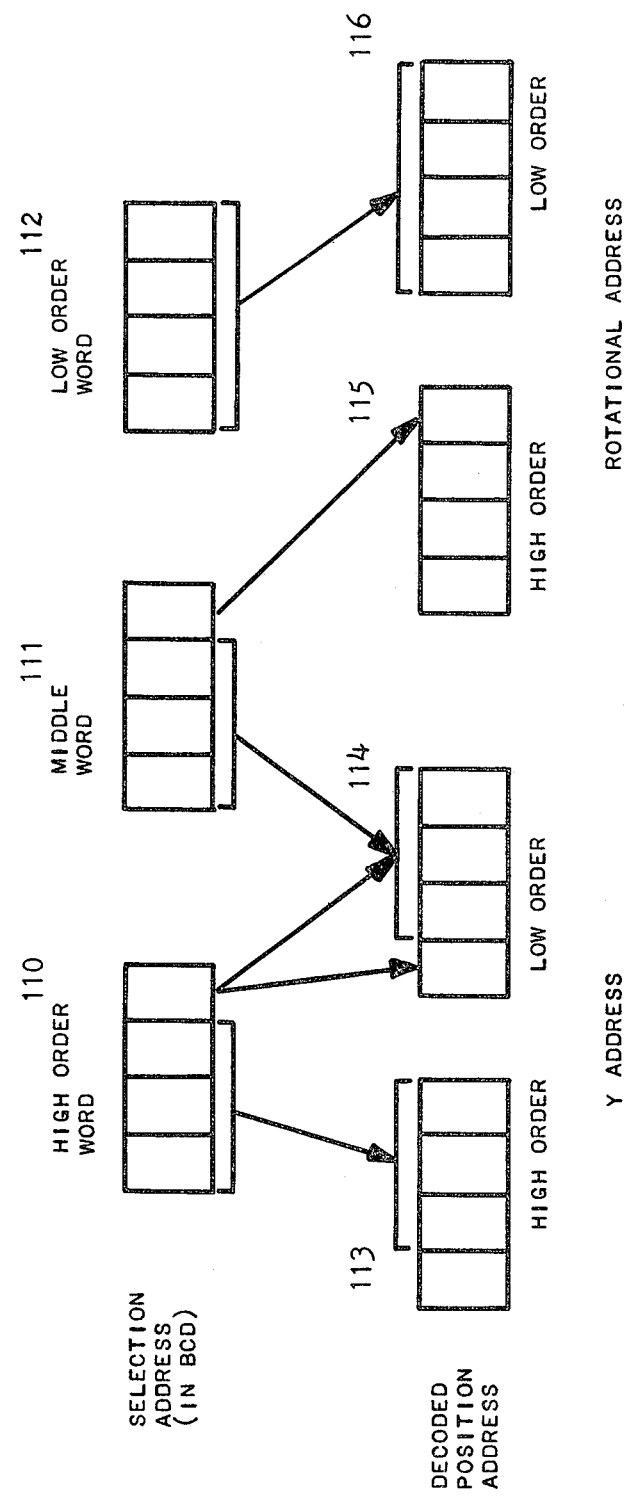
FIG. 10 is a diagram showing the address arrangement and address position decoding scheme.

The cassette storage addresses range, in the preferred embodiment, between 0 and 999 with positions 0–19 in the lowest storage tier, positions 20–39 in the tier immediately above, and so on, with the highest tier holding address positions 980–999. To decode the 3 digit BCD selection address into a rotational and vertical position number, the scheme illustrated in FIG. 10 is used. The rotational position number 115, 116 is formed from the low order address word 112 and the first bit of the middle word 111 (which is a one if the middle address number is odd). The vertical or Y-address 113 and 114 is the higher and middle words 110 and 111, respectively, right shifted one position with carry (which has the effect of dividing the selection address by 20).

The decoded rotational and vertical position numbers 115, 116 and 113, 114 respectively are used by the selection mechanism controller 44 to control the peripheral motor controller 62 over control lines 70. The next movement is determined from the position addresses and an internal movement sequence register, the fetch internal status word (FISW) 44D. The movement sequence for a fetch operation and the coding of the FISW 44D is shown in Table 5 below:

plete signal over line 42, signaling the position control subsection 44A that the one position movement has been completed. Self alignment of the selection mechanism is provided by the feedback nature of address position sensing, and guide pins 14.

Completion of either a fetch or store operation causes the position controller 44A to increment the SSW 45A by sending a "process complete" signal to the scheduling control 45 over line 49.

Processing Controller 47 [CC400–CC449, CC540–CC549] and Preprocessing Peripheral Controller 66

Preprocessing or cue station control is managed by another subsection of the special controller, the preprocessing control 47, in conjunction with the preprocessing peripheral controller 66. This subsection receives from the scheduling control 45 the directive that a cue or decue operation is to be initiated and in the former case, from the selection address memory 7, that part of the selection address which refers to the intra-cassette address. In a decue operation, the controller 47 merely sends over preprocessor control lines 71, a command to activate the "rewind" motor in the cue station.

Figure 12:
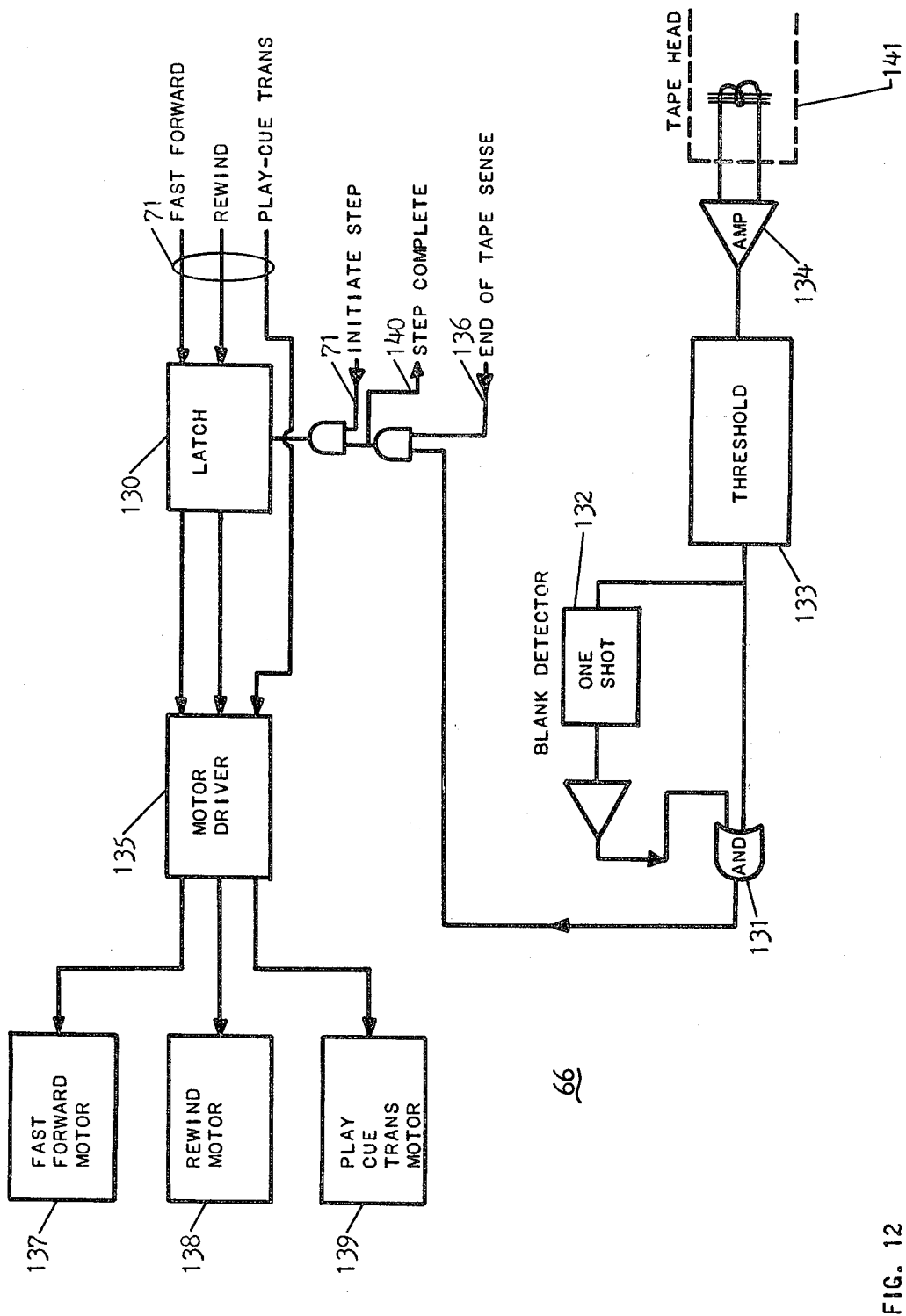
FIG. 12 is a schematic diagram of the preprocessing peripheral control circuitry including gap detector circuitry.

The preprocessing peripheral controller 66 shown in greater detail in FIG. 12, implements this command via gate or latch 130, motor driver 135 and rewind motor Table 5

| CODE | FETCH INTERNAL STATUS WORD (FISW) FETCH MECHANISM MOVEMENT | CODE MOVEMENT TYPE | CODE RETRACTION FISW MECHANISM |
|---|---|---|---|
| 0 | Reference (Idle position) |  | Open |
| 1 | Moving +Θ | Variable (Θ position address) | " |
| 2 | Moving +Y | Variable (Y position address) | " |
| 3 | Moving +Z (in-out) | Fixed | " |
| 4 | Moving −Z | " | Closed |
| 5 | Moving −Y | Variable (Y position address) | " |
| 6 | Moving (−Θ) | Variable (Θ position address) | " |
| 7 | Reference | Fixed | " |
| 8 | Moving +Z (PS) | " | " |
| 9 | Moving −Z (PS) | " | Open |

The sequence for a restore is similar except the sequence is entered at step 7, continues with step 0 after step 9 through step 6, and the retraction mechanism position is reversed.

Figure 11:
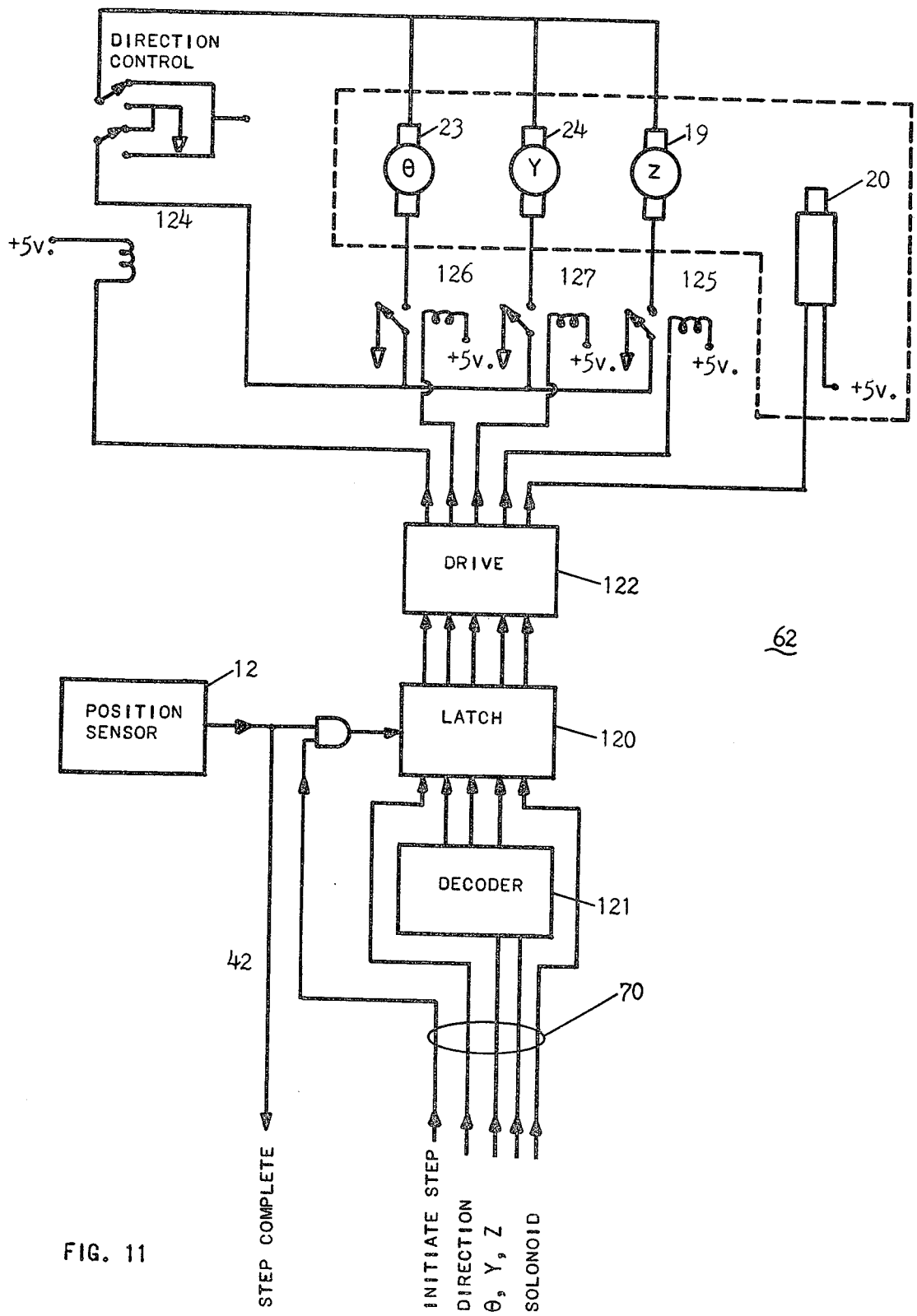
FIG. 11 is a schematic diagram of the peripheral motor controller of FIG. 7.

Commands for the next movement from the position controller 44B are implemented by the peripheral motor controller 62 shown in FIG. 11. The movement command is decoded by decoder 121 and implemented by latch or gate 120, relay driver 122 and motor control relays 124, 125, 126, 127 when the position sensor 12 detects a new address position. Gross position information is fed back to the peripheral motor control 62 and the selection mechanism control 44 from an electro-optical device, the position sensor 12, mounted on retraction support plate 18 (FIG. 3). This device responds to the presence of reflective tape 8 mounted adjacent to cassette storage locations in the fixed storage area 4.

Detection of the next address position via the position sense 12 enables the motor latch 120 causing the next movement control word 44C to be latched and effect movement control as well as sending a step-com- 138. The command is deactivated automatically by the peripheral controller 66 upon reception via line 136 of an "end of tape" signal from the cue station. This signal is also sent to the preprocessing controller 47 over line 140 indicating a step complete which in turn is sent to the schedule control 45 over "process complete" sense line 49 to update the SSW 45A.

A primary feature of this invention is the ability to access intra-unit information. The cue function of the preprocessing station 2 achieves this by insuring that the cassette tape is positioned such that after transfer to the play station, playback begins at the appropriate place on the tape. This intra-cassette addressing is conveniently achieved without special tape preparation by referencing to tape side and to the normal inter-record gaps found in industry standard pre-recorded tapes; that is, the several second (3–6 sec) period of silence which separates one song from another.

Thus, the intra-cassette portion of the selection address consists of two sections: the side (A or B) address, and the position of the song on a given side. Assuming all tapes are stored in a full rewind condition, as assured by the decue operation, to select the third song on side one the processing station moves the tape forward at higher than normal speeds, i.e. "fast forward" motor speed 137, until the second interrecord blank is sensed by blank detection circuitry in the special controller. If a song on side 2 is selected, the tape is first wound to the "full forward" position and rewound at 138 the appropriate number of blanks.

In some applications, specialized intra-unit addressing can be used instead of utilizing the inter-record gaps. For example, a time or other code can be prerecorded on the tape and used to identify the location of songs or other information recorded on the tape.

In a cue operation, the fast forward motor 137 is activated until the appropriate number of inter-record blanks have passed a detection head 141. Blank detection is via a magnetic tape head 141 feeding a threshold device 133 through amplifier 134 to a timing circuit composed of a one shot multivibrator 132 and gate 131. The presence of a blank or inter-record gap is used to lead the next command into latch 130 and is sent to the preprocessing control 47 over line 140 to indicate a step complete. As with selection mechanism control, the preprocessing control 47 commands the peripheral controller 66 to either continue or halt tape movement based on the intra-unit address. When the cue process is complete, the preprocessing control 47 sends a process complete signal over line 49 to update the SSW 45A.

The preprocessor control 47 and peripheral controller 66 also handle the movement of the preprocessing/play station transfer mechanism 149 over preprocessor control lines 71, latch 130, motor driver 135 and preprocesing /play transfer motor 139. The preprocessing processor and peripheral control also sends the appropriate signals to increment the SSW 45A upon completion of the transfer.

Play Station Controller 48

Control of the play station 1 is achieved in a manner similar to that of the preprocessing mechanism. The play station controller 48 activates the play station to play over control lines 72 upon command from the scheduling control 45. A blank detector similar to that in the preprocessor peripheral control 66 is used to send a play complete signal to the controller over sense line 79. The processor either halts the play station if a single song is selected or until a side complete signal is sensed over line 80 if a side has been selected. When the play station control 48 halts the play station, a process complete signal is sent to the scheduling control 45 over line 49 to update the PSW 45B.

In the embodiment described, the sequence of set retrieval is determined by human operation of the key board 30. However, it should be understood that other sources can be utilized to instigate and carry out retrieval sequencing. For example, a remote computer, another cassette unit, or random sequencing can be used for this purpose.

The play or processing station described in this embodiment can function not only to play back prerecorded tape cassettes but can be used to record signals as well. In this mode of operation, it is apparent that automated or semi-automated cassette tape recordings can be carried out.

Figure 13:
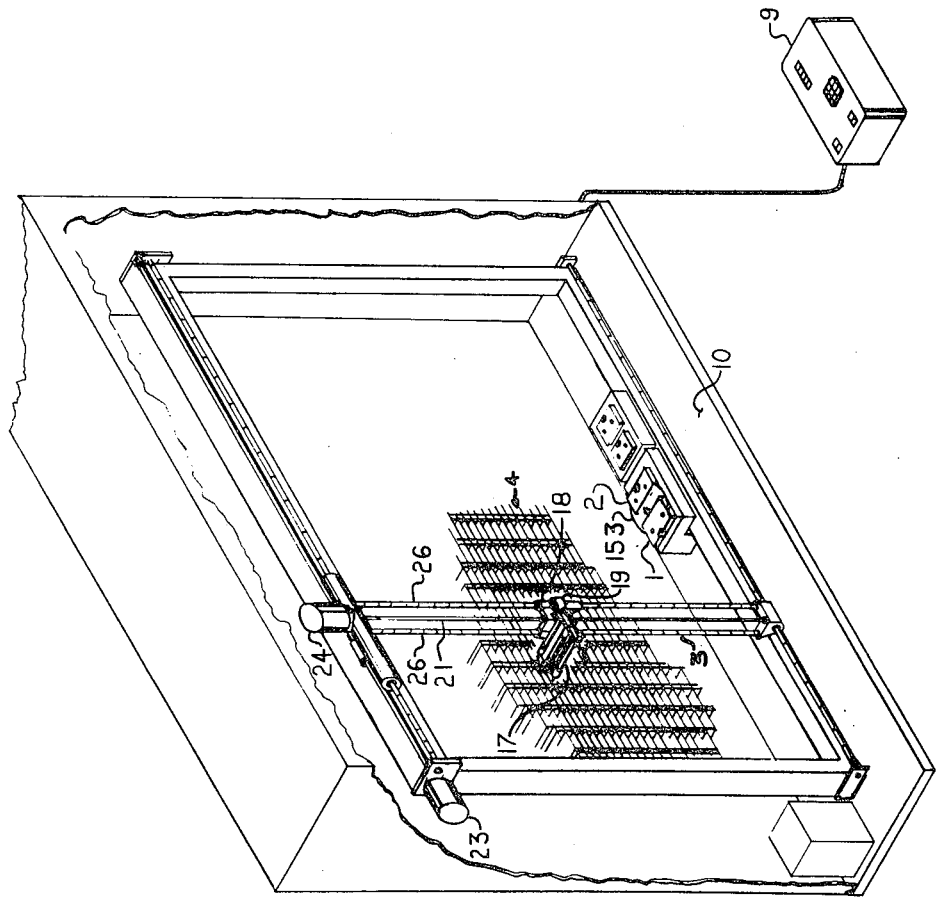
FIG. 13 is an alternate embodiment of the mechanical arrangement of the retrieval system components schematically described in FIG. 1, including a flat, planar storage area.

FIG. 13 illustrates an alternate design to the cylindrical storage area illustrated in FIG. 2. Here the cassettes are arranged in a rectilinear or planar matrix and the retrieval/retraction mechanism 17 is operated along $x$, $y$ linear coordinates rather than along the angular coordinate system of the storage area of FIG. 2.

Another advantage of the invention is its ability, in one embodiment, to withstand severe failure conditions such as an abrupt power failure. The decode address buffer 44E and current play address buffer 44C are implemented with external registers powered by a small independent re-chargable battery source. Upon initial start-up the contents of the buffers must be zero or a last cycle is automatically entered which restores cassettes left in the selection mechanism 3, cue station 2, or play station 1 to their proper storage location before new selections are accepted.

TABLE 2

| | | COMPUTER LISTING INITIALIZATION SECTION | | |
|---|---|---|---|---|
| CC100 | | FIM 8 | P4 | /INIT ENTER STATUS |
| | | FIM 40 | P2 | /INITIALIZE PROMPTING LITES |
| | | JMS | 2; | |
| CC110 | | OUTP | | |
| /INPUT SECTION | | | | |
| /INPUT KEYBOARD CHARACTER | | | | |
| CC120 | IN, | FIM 205 | P2 | /REG4 = WEIGHT (−4 INT) /REG5 = −3 |
| | | FIM 0 | P0 | |
| | INLOOP, | CLB | | |
| | | LDM | 4 | |
| | | ADD | 4 | /INCR WEIGHT BY 4 |
| | | XCH | 4 | /AND RESTORE |
| | | SRC | P0 | /SELECT FOR ROM READ |
| | | INC | 0 | /INCR ROM READ |
| | | RDR | | /READ INPUT LINE |
| | | JCN ANZ | ; | |
| DECODE /GO TO 'DECODE'IF AC 1 = 0 | | | | |
| | | ISZ | 5; | |
| INLOOP /LOOP IF NOT THE LAST LINE | | | | |
| | | LD | 6 | /ELSE CLEAR BIT 3 OF KBD |
| | | RAR | | /SATUS WORD (INDICATING NO |
| | | CLC | | /INPUT RECEIVED), AND JUMP TO |
| | | RAL | | /'EXECUTIVE SECTION' |
| | | XCH | 6 | |
| | | JUN | 0; | |
| | | EXC | | |
| /DECODE KEYBOARD ENTRY | | | | |

TABLE 2-continued
COMPUTER LISTING
INITIALIZATION SECTION

|   | DECODE, | KBD |   | /DECIMAL ADJUST INPUT |
|---|---|---|---|---|
|   |   | RAL |   | /TEST FOR MULTIPLE KEY STRUCK |
|   |   | JCN CNZ | ; |   |
|   |   | IN |   | /JUMP TO BEGINNING IF ENTRY /ERROR |
|   |   | RAR |   | /ELSE RESTORE AND DECODE INPUT' |
|   |   | CLC |   |   |
|   |   | ADD | 4 |   |
|   |   | XCH | 3 | /AND STORE TEMP. IN REG 3 |
|   |   | LD | 6 | /CHECK TO MAKE SURE KBD RELEASE |
|   |   | RAR |   | /HAS OCCURRED SINCE LAST /ENTRY (DEBOUNCE) |
|   |   | JCN CNZ | ; |   |
|   |   | EXC |   | /ELSE JUMP TO 'EXECUTIVE /SECTION' |
|   |   | INC | 6 | /SET KBD STATUS TO INACTIVE |
|   |   | LDM | 12 | /TEST FOR REJECT ENTRY |
|   |   | SUB | 3 |   |
|   |   | JCN ANZ | ; |   |
|   |   | IN1 |   |   |
|   |   | JMS | ; |   |
|   |   | REJ |   |   |
|   |   | JUN | ; |   |
|   |   | EXC |   |   |
|   | IN1, | LDM | 12 | /TEST FOR ENTER ENTRY |
|   |   | SUB | 3 |   |
|   |   | JCN AZ | ; |   |
|   | ENTER | /AND JUMP TO 'ENTER SECTION IF APPROPRIAT |   |   |
|   |   | CLB |   |   |
|   |   | LDM | 10 | /ELSE TEST FOR "O" ENTRY (10) |
|   |   | SUB | 3 |   |
|   |   | JCN ANZ | ; |   |
|   |   | PDS |   | /IF "O" ENTRY (10) THEN STORE |
|   |   | XCH | 3 | /A O IN TEMP IR 3 |
|   | PDS, | FIM | P0 | /ELSE INITIALIZE FOR PUSHDOWN /STORE |
|   |   | 32 |   | /INTO RAMO, REG3, RD2 |
|   |   | SRC | P0 | /GET MOST SIGNIFICANT WORD |
|   |   | RD1 |   | /PUSH DOWN STORE (RD1 TO RD0) |
|   |   | WR0 |   |   |
|   |   | RD2 |   | /AND PUSH DOWN STORE(RD2 TO RD1) |
|   |   | WR1 |   |   |
|   |   | LD | 3 | /GET NEW ENTRY AND STORE IN RD2 |
|   |   | WR2 |   |   |
|   |   | JMS | 2; |   |
|   | DISPL |   |   |   |
|   |   | JUN | ; |   |
| CC199 |   | EXC |   | /GO TO EXC SECTION |
|   | / |   |   |   |
|   | /ENTER SECTION |   |   |   |
| CC200 | ENTER, | JMS | ; |   |
|   |   | LDLP |   | /LAST PLAY POINTER TO IR 1 |
|   |   | FIM | P0 | /SET UP FOR ACCESSING |
|   |   | 32 | 0 | /ROM 0,REG 2, RD 0-2 |
|   |   | LD | 9 | /CHECK ENTER STATUS WORD FOR |
|   |   | RAL |   | /ENTER SIDE NUMBER MODE |
|   |   | JCN CNZ | ; |   |
|   | CASS |   |   | /JUMP IF ENTER CASSETTE NUMBER /MODE |
|   |   | RAL |   | /CHECK OF ENTER SIDE NU |
|   |   | JCN CZ | ; |   |
|   | SONG |   |   |   |
|   | /ENTER SIDE NUMBER |   |   |   |
|   |   | LDM | 2 | /SET ENTER STATUS TO SONG MODE |
|   |   | XCH | 9 | /AND RESTORE |
|   |   | SRC | 0 | /GET SIDE NUMBER FROM TEMP /(RAM 0,) |
|   |   | RD2 |   |   |
|   |   | DAC |   | /CHECK IF SIDE 1 SELECTED |
|   |   | JCN AZ | ; |   |
|   | SIDE 1 |   |   |   |
|   |   | LDM | 1 |   |
|   | SIDE 1, | WR3 |   | /STORE 0 (FOR SIDE 1) OR 1 /IN TEMP WR3 |
|   |   | PAUSE |   |   |
|   |   | JUN | ; |   |
| CC219 |   | PTDIS |   | /AND GO TO NEXT SECTION /ENTER CASSETTE NUMBER |
| CC220 | CASS, | SRC | 0 | /GET MOST SIGNIFICANT WORD FROM TEMP |
|   |   | RD0 |   |   |
|   |   | XCH | 8 | /AND STORE INN REG 8 |
|   |   | CLB |   |   |
|   |   | JMS | ; |   |
|   | STORE |   |   | /STORE IN APPROPRIATE RAM LOCATING |
|   |   | RD1 |   | /REPEAT FOR 2ND AND 3RD WORDS |
|   |   | XCH | 8 |   |

TABLE 2-continued

COMPUTER LISTING
INITIALIZATION SECTION

|  |  |  |  |  |
|---|---|---|---|---|
|  |  | LDM | 1 |  |
|  |  | JMS | ; |  |
|  | STORE |  |  |  |
|  |  | RD2 |  |  |
|  |  | XCH | 8 |  |
|  |  | LDM | 1 | /INCREMENT REG NUMBER BY 1 (NO) |
|  |  | JMS | ; |  |
|  | STORE | LDM | 4 | /SET ENTER STATUS WORDD FOR |
|  |  | XCH | 9 | /SIDE NUMBER |
|  |  | JUN | ; |  |
|  |  | PTDIS |  | /GO TO NEXT SECTION |
|  |  |  |  | /ENTER SONG NUMBER |
|  | SONG, | LDM | 8 | /SET ENTER STATUS TO CASS. NU |
|  |  | XCH | 9 |  |
|  |  | SRC | 0 |  |
|  |  | RD2 |  | /GET SONG NU, SHIFT AND STORE |
|  |  |  |  | /TEMP |
|  |  | RAL |  |  |
|  |  | XCH | 8 | /STORE TEMP |
|  |  | RD3 |  | /GET SIDE NO & ADD SONG NU |
|  |  | ADD | 8 |  |
|  |  | XCH | 8 | /AND PLACE IN REG 8 |
|  |  | LDM | 3 | /SET UP TO STORE IN RAM REG 3 |
|  |  | JMS | ; |  |
|  | STORE |  |  | /STORE IN APPROPRIATE RAM |
|  |  |  |  | /LOCATION |
|  |  | JMS | ; |  |
|  |  | LDLP |  | /GET LAST PLAY POINTER |
|  |  | JMS | ; |  |
|  |  | LDNP |  | /RESTORE NEXT PLAY POINTER |
|  |  | JMS | ; |  |
|  |  | INCR |  | /INCR AND COMPARE POINTERS |
|  |  | JMS | ; |  |
|  |  | COMP1 |  | /TO CHECK FOR FULL MEMORY |
|  |  | JCN AZ | ; |  |
|  |  | NORM |  | /IF AC=1 MEMORY FULL SET |
|  |  |  |  | /ENTER STATUS |
|  |  | XCH | 9 |  |
|  |  | JUN | ; |  |
| CC269 |  | PTDIS |  |  |
|  | NORM, | JMS | ; |  |
|  |  | STLP |  | /STORE INCR LAST PLAY POINTER |
|  |  |  |  | /DISPLAY PROMPTING LITE |
| CC270 | PTDIS, | LDM | 2 | /SELECT PROMPTING LITES |
|  |  | XCH | 4 | /DEVICE NUMBER 2 = PROMPTING |
|  |  |  |  | LITES |
|  |  | LD | 9 | /GET ENTER STATUS WORD |
|  |  | JMS | 2; |  |
| CC274 |  | OUT1 |  | /AND OUTPUT |
|  |  |  |  | /CLEAR TEMP INPUT AREA (RAM 0, |
|  |  |  |  | /REG 2 RD 0-3) |
|  |  |  |  | /AND CLEAR INPUT NUMERICAL |
|  |  |  |  | DISPLAY |
| CC275 |  | FIM | 0 | /SET UP TO STORE IN RAM 0, REG 2 RB |
|  |  | 32 | 0 |  |
|  |  | SRC | 0 |  |
|  |  | CLB |  | /CLEAR AC |
|  |  | WR0 |  | /AND STORE IN RD 0-3 |
|  |  | WR1 |  |  |
|  |  | WR2 |  |  |
|  |  | JMS | 2; |  |
|  | DISPL |  |  | /CLEAR DISPLAY |
|  | / |  |  |  |
|  | EXC, | JUN | 1; |  |
| CC299 |  |  | 0 | /PAGE JUMP |
|  | PAUSE |  |  |  |

SCHEDULING SECTION

|  |  |  |  |  |
|---|---|---|---|---|
| CC300 | EXC, | FIM | P0 | /SET UP TO READ RAM 3 |
|  |  | 48 |  |  |
|  |  | SRC | 0 |  |
|  |  | RDR |  | /READ ALARMS |
|  |  | RAL |  | /AND TEST |
|  |  | JCN CNZ | ; |  |
|  |  | FINT |  | /INTERRUPT OR STEP COMPLETE |
|  |  |  |  | /SERVICE |
|  |  | RAL |  |  |
|  |  | JCN CNZ | ; |  |
|  | PSHALT |  |  |  |
|  |  | RAL |  | /TEST FOR OFF |
|  |  | JCN CZ | ; |  |
|  |  | EXC1 |  |  |
|  |  | JMS | ; |  |
|  |  | LDLP |  | /FORCE A LAST CYCLE CONDITION |
|  |  | LD | 2 | /BY SETTING LLPAP = NPAP |
|  |  | XCH | 4 |  |
|  |  | LD | 3 |  |
|  |  | XCH | 5 |  |
|  |  | LD | 6 | /SET OFF STATUS |
|  |  | RAL |  |  |
|  |  | STC |  |  |

TABLE 2-continued

COMPUTER LISTING
INITIALIZATION SECTION

```
                        RAR
                        XCH     6
                        JMS     ;
                        STNP
            PSHALT,     JMS     ;
                        REJ
/
            EXC1,       LD      6           /RESET INTR SERVICE BIT
                        RAR;
                        RAR
                        CLC
                        RAL;
                        RAL
                        XCH     6
/
/
            /SKEDULING CONTROL
                                            /TEST SSW TO DETERMINE NEXT
                                            /STEP INITIATE
/
            EXC2,       CLB
                        LD      12          /SSW
                        JCN AZ  ;
            FETCH
                        DAC;
                        DAC
                        JCN AZ  ;
            CUE
                        DAC;
                        DAC
                        JCN AZ  ;
                        PCT
                        DAC;
                        DAC
                        JCN AZ  ;
                        PS
                        DAC
                        JCN AZ  ;
            DECUE
                        DAC;
                        DAC
                        JCN AZ;
                        DEFETCH
                        DAC;
                        DAC
                        JCN AZ;
                        CYCOM
CC349                   JUN     ;
                        IN                  /RETURN TO BEGIN
CC350       /FETCH SECTION
            FETCH,      JMS     ;
                        COMP                /COMP ADR POINTERS
                        JCN AZ  ;
            FETCH1                          / CONTINUE IF UNEQUAL
                        LD      10          /ELSE TEST FOR 1ST CYC
                        RAL;
                        RAL                 /IF 1ST CYC DO NOT FETCH
                        JCN CZ  ;
            EXIT
                        CLB
                        LDM     2           /SET LAST CYC FLAG
                        ADD     10
                        XCH     10
                        LDM     4           /SET SSW TO PC/T REQ AND EXIT
                        XCH     12
                        JUN     ;
            IN
            FETCH1,     CLB
                        LDM     8           /FLIP PS ACTIVE FLAG
                        ADD     10
                        XCH     10
/
/                                           ADDRESS LOAD —LOAD NEW FETCH/
/                                           DEFETCH ADR AND CUE ADDRESS
                                            INTO
/                                           APPROPRIATE STORAGE BUFFERS
                        JMS     ;
                        LDNP
                        FIM     P0          /SET UP FOR REG 0, RAM 1
                        64
                        LDM     13          /SET UP TO LOOP
                        XCH     8
            ADV,        SRC     P2
                        RDM
                        SRC     P0
                        WR2
                        INC     0
                        INC     4
                        ISZ     8;
                        ADV
```

TABLE 2-continued

COMPUTER LISTING
INITIALIZATION SECTION

| | | | | |
|---|---|---|---|---|
| | | SRC | P2 | |
| | | WRM | | /LOAD NEG CUE ADR TO STORAGE BUFFER |
| | | RAR; | | |
| | | CMA | | |
| | | XCH | 13 | /CUE BUFFER |
| | | JMS | 1; | |
| | | FETLD | | /DECODE & LOAD CURRENT FETCH ADR |
| | | CLB | | /SET FETCH INTERNAL STATUS (FIS) /WORD |
| | | XCH | 11 | |
| | | JMS | ; | |
| | | INCNP | | /INCR NP POINTER |
| | | JMS | ; | |
| | | STNP | | |
| | | LD | 9 | /CHECK ENTER STATUS FOR FULL |
| | | RAR | | |
| | | JCN CZ | ; | |
| | FETCH 2 | | | |
| | | LDM | 8 | /IF FULL, RESET AND OUTPUT NEW |
| | | XCH | 9 | /STATS |
| | | FIM | P2 | |
| | | 40 | | |
| | | JMS | 2; | |
| | | OUTP | | //CHECK OLD ADR=NEW ADR |
| CC399 | FETCH 2, | JUN | 1; | |
| | | FEXIT | | |
| CC400 | CUE, | LD | 13 | /IF CUE ADR0, SKIP |
| | | JCN AZ | ; | |
| | | IN EXIT | | |
| | | FIM | P2 | /INITIATE CUE (F.FWD) |
| | | 20 | | /DS=1, D=4 |
| | | JMS | 2; | |
| | | OUTP | | |
| | | JUN | 1; | |
| | | EXIT | | |
| | | | | /PLAY-CUE TRANSFER |
| | PCT, | FIM | P2 | /INITIATE PLAY-CUE TRANSFER |
| | | 17 | | /DS=1, D=1 |
| | | JMS | 2; | |
| | | OUTP | | |
| | | JUN | 1; | |
| | | EXIT | | |
| | | | | /START PLAY STATION SECTION |
| | PS, | LD | 10 | /CHECK PS FOR NOW PLAYING |
| | | RAR | | |
| | | JCN CNZ | ; | |
| | | EXIT | | /EXIT IF NOW PLAYING |
| | | JMS | 1; | |
| | | MOVE | | /SWITCH & DISPLAY CURRENT PLAY ADR |
| | | LD | 10 | |
| | | RAR; | | |
| | | RAR | | |
| | | JCN CNZ | ; | |
| | | INEXIT | | /SKIP PLSY START IF LAST CYC //TEST "SAME CASSETTE" FLAG AND //SET SSW=CUE REQ. IFE |
| | | FIM | P2 | |
| | | 18 | | /DS=1 D=2 (START PS) |
| | | /MODIFIED FOR SINGLE PS | | |
| | | INC | 10 | /SET PSW=PLAY |
| | | / | | |
| | CTEXIT, | JMS | 2; | |
| | | OUTP | | |
| | INEXIT, | INC | 12 | /INCR SSW |
| CC499 | EXIT, | JUN | ; | |
| | | IN | | /RETURN TO BEGINNING |
| | / | | | |
| | / | | | |
| | | | | /DECUE SECTION |
| CC450 | DECUE, | LD | 10 | /TEST 1ST CYC FLAG |
| | | RAL; | | |
| | | RAL | | /IF SET, SKIP DECUE AND DEFETCH |
| | | JCN CNZ | ; | /SECTIONS |
| | | DCUE1 | | |
| | | LDM | 11 | /SET SSW=CYC COMPLETE |
| | | XCH | 12 | |
| | | JUN | ; | |
| | | IN | | |
| | DCUE1, | FIM | P2 | /INITIATE DECUE(REWIND) |
| | | 18 | | /DS=1, D=2 |
| | | JMS | 2; | |
| | | OUTP | | |
| | | JUN | 1; | |
| | | EXIT | | / |
| | | | | /DEFETCH SECTION |
| | DEFETCH, | JMS | 1; | |
| | | FETLD | | |

TABLE 2-continued
COMPUTER LISTING
INITIALIZATION SECTION

|  |  |  |  |  |
|---|---|---|---|---|
|  |  | LDM | 7 | /SET FIS TO DEFETCH |
|  |  | XCH | 11 |  |
|  |  |  |  | /DEFETCH SECTION |
|  | DEFETCH, | JMS | 1; |  |
|  |  | FETLD |  |  |
|  |  | LDM | 7 | /SET FIS TO DEFETCH |
|  |  | XCH | 11 |  |
|  | FEXIT, | INC | 12 | /INCR SSW |
|  |  | FIM | P7 | /INITIATE TO ONE STEP |
|  |  |  | 2 |  |
|  | FINT, | JMS | 2; |  |
|  |  | INT |  | /FORCE INTERRUPT (TO INITIATE) |
|  |  | JUN | 0; |  |
| CC479 | /IN |  |  |  |
|  |  |  |  | /CYCLE COMPLETE SECTION |
| CC480 | CYCOM, | LD | 10 | /TEST LAST CYC. FLAG |
|  |  | RAR; |  |  |
|  |  | RAR |  |  |
|  |  | JCN CZ | ; |  |
|  |  | CYCM1 |  |  |
|  |  | CLB |  |  |
|  |  | XCH | 10 | /RESET LAST CYC, 1ST CYC, ACT |
|  |  |  |  | /PS FLAG |
|  |  | LD | 6 | /TEST FOR OFF |
|  |  | RAL |  |  |
|  |  | JCN CZ | ; |  |
|  |  | CYCM2 |  | /OFF |
|  | OFF, | FIM | P2 | /SHUTDOWN |
|  |  |  | 96 | /DS=6 |
|  |  | JMS | 2; |  |
|  |  | OUTP |  |  |
|  | HALT, | JUN | 1; |  |
|  |  | HALT |  | /DYNAMIC HALT |
|  | CYCM1, | LDM | 4 | /RESET LAST CYC, 1ST CYC FLAGS |
|  |  | XCH | 8 | /STORE "4" TEMP |
|  |  | LD | 10 | /LOAD PSW TEMP AND SAVE PLAY |
|  |  |  |  | /STATUS |
|  |  | RAR |  |  |
|  |  | LDM | 0 | /CLEAR ACC |
|  |  | ADD 8 |  | /"4" + CY (PLAY STATUS) |
|  |  | XCH | 10 |  |
|  | CYCM2, | CLB |  | /RESET SSW = FETCH REQ |
|  |  | XCH | 12 |  |
|  |  | JUN | ; |  |
| CC499 |  | IN |  | /RETURN TO BEGINNING |
|  |  |  |  | /INTERRUPT SERVICE ROUTINES |
|  |  |  |  | /CALLED WHEN "STEP COMPLETE" |
|  |  |  |  | /SIGNAL ACTIVE |
|  |  |  |  | /HANDLES FETCH STEPS, DECUE |
|  |  |  |  | /(AND CUE) STEPS |
|  |  |  |  | / |
|  |  |  |  | /CHECK IF NEW INTERRUPT SIGNAL |
| CC500 | INT, | LD | 6 | /CHECK FOR INTR. SERVICE |
|  |  | RAR; |  |  |
|  |  | RAR |  |  |
|  |  | JCN CNZ | ; |  |
|  |  | EXIT |  | /EXIT IF NOT NEW CALL |
|  |  | STC; |  |  |
|  |  | RAL; |  |  |
|  |  | RAL |  | /SET INTR SERVICE BIT |
|  |  | XCH | 6 |  |
|  |  |  |  | /CHECK IF STEP COMPLETE |
|  |  | CLD |  | /CHECK WHICH STEP COMPLETE |
|  |  | LDM | 2 |  |
|  |  | SUB | 12 |  |
|  |  | JCN AZ | ; |  |
|  |  | CUE |  |  |
|  |  | LD | 12 |  |
|  |  | DAC |  |  |
|  |  | JCN AZ | ; |  |
|  |  | FSTEP |  |  |
|  |  | CLB |  |  |
|  |  | LDM | 10 |  |
|  |  | SUB | 12 |  |
|  |  | JCN AZ | ; |  |
|  |  | FSTEP |  |  |
|  |  | JUN | 2; |  |
|  |  | DCUE |  |  |
| CC539 | EXIT, | BBL |  |  |
|  | / |  |  |  |
|  | /CUE-DECUE SECTION |  |  |  |
| CC540 | CUE, | ISZ | 13; |  |
|  |  | EXIT |  | /INCR CUE ADR, SKIP IF 0 |
|  | DCUE, | INC | 12 | /INCR SSW |
|  |  | FIM | P2 | /HALT CUE/DECUE |
|  |  |  | 16 | /DS=1 D=0 |
|  |  | JMS | 2; |  |
|  |  | OUTP |  |  |
| CC549 |  | BBL |  |  |
|  |  |  |  | /FETCH STEP SERVICE |

TABLE 2-continued
COMPUTER LISTING
INITIALIZATION SECTION

|  |  |  |  |  |
|---|---|---|---|---|
|  |  |  |  | /DECREMENT STEP NUMBER AND CHECK |
|  |  |  |  | /IF LAST STEP |
| CC550 | FSTEP, | JMS | 2; |  |
|  |  | WDC |  |  |
|  |  | JCN AZ | ; |  |
|  |  | EXIT |  |  |
|  | SEQ, | CLB |  |  |
|  |  | INC | 11 | /LAST STEP: INCR FIS, SEL NEXT E |
|  |  | LD | 11 | /BASED ON FIS |
|  |  | DAC |  |  |
|  |  | JCN AZ | ; |  |
|  |  | X1 |  |  |
|  |  | DAC |  |  |
|  |  | JCN AZ | ; |  |
|  |  | Y1 |  |  |
|  |  | DAC |  |  |
|  |  | JCN AZ | ; |  |
|  |  | Z1 |  |  |
|  |  | DAC |  |  |
|  |  | JCN AZ | ; |  |
|  |  | Z2 |  |  |
|  |  | DAC |  |  |
|  |  | JCN AZ | ; |  |
|  |  | Y2 |  |  |
|  |  | DAC |  |  |
|  |  | JCN AZ | ; |  |
|  |  | X2 |  |  |
|  |  | DAC |  |  |
|  |  | JCN AZ | ; |  |
|  |  | PSY1 |  |  |
|  |  | DAC |  |  |
|  |  | JCN AZ | ; |  |
|  |  | PSY3 |  |  |
|  |  | DAC |  |  |
|  |  | DAC |  |  |
|  |  | JCN AZ | ; |  |
|  |  | Z1 |  |  |
|  |  | DAC |  |  |
|  |  | JCN AZ | ; |  |
|  |  | PSY 3 |  |  |
|  |  | DAC |  |  |
|  |  | DAC |  |  |
|  |  | JCN AZ | ; |  |
|  |  | Z2 |  |  |
|  |  | DAC |  |  |
|  |  | JCN AZ | ; |  |
|  |  | PSY2 |  |  |
|  |  | DAC |  |  |
|  |  | JUN | 2; |  |
|  |  | RLAST |  |  |
|  | /X1 | +X MOVEMENT |  |  |
|  | X1, | LDM | 1 | /LOAD X ADDRESS |
|  |  | JMS | 2; |  |
|  |  | LDADR |  |  |
|  |  | LDM | 2 | /OUTPUT X STEP 8(0010) |
|  |  | JUN | 2; |  |
|  |  | FOUT |  |  |
|  | /Y1 | +Y MOVEMENT |  |  |
|  | Y1, | CLB |  | /LOAD Y ADDRESS |
|  |  | JMS | 2; |  |
|  |  | LDADR |  |  |
|  |  | LDM | 4 | /OUTPUT Y STEP (0100) |
|  |  | JUN | 2; |  |
|  |  | FOUT |  |  |
|  | /Z1 | +Z MOVEMENT |  |  |
|  | Z1, | FIM | P7 | /ONE STEP ONLY |
|  |  | 1 |  |  |
|  |  | JMS | 2; |  |
|  |  | GTEST |  | /SET FINGER CNTL BIT |
|  |  | LDM | 6 | /OUTPUT Z STEP (0110) |
|  |  | JUN | 2; |  |
|  |  | FOUT |  |  |
|  | /Z2 | −Z MOVEMENT |  |  |
|  | Z2, | FIM | P7 | /ONE STEP ONLY |
|  |  | 1 |  |  |
|  |  | JMS | 2; |  |
|  |  | GTEST |  |  |
|  |  | LDM | 14 | /OUTPUT −Z STEP (1110) |
|  |  | JUN | 2; |  |
|  |  | FOUT |  |  |
|  | /Y2 | −Y MOVEMENT |  |  |
|  | Y2, | CLB |  | /LOAD Y ADR |
|  |  | JMS | 2; |  |
|  |  | LDADR |  |  |
|  |  | LDM | 12 | /OUTPUT −Y STEP (1100) |
|  |  | JUN | 2; |  |
|  |  | FOUT |  |  |
|  | /X2 | −X MOVEMENT |  |  |

TABLE 2-continued
COMPUTER LISTING
INITIALIZATION SECTION

| | | | |
|---|---|---|---|
| X2, | LDM | 1 | /LOAD X ADR |
| | JMS | 2; | |
| | LDADR | | |
| | LDM | 10 | /OUTPUT −X STEPS (1010) |
| | JUN | 2; | |
| | FOUT | | |
| / | | | |
| | PAUSE | | |
| / | | | |
| | | | /PSX POSSIBLE +X MOVE TO PS1 |
| PSY1, | LD | 12 | /IF DEFETCH, EXIT HERE |
| | DAC | | |
| | JCN ANZ | ; | |
| | FEXIT | | |
| | FIM | P7 | |
| | | 8 | /MOVE 8 STEPS |
| | CLC | | /CLEAR FINGER CNTL BIT |
| | LDM | 4 | /OUTPUT +Y STEPS (0100) |
| | JUN | 2; | |
| | FOUT | | |
| /PSY2 | | | /STEP BACK DOWN (8) IF FETCH |
| PSY 2, | LD | 12 | /IF DEFETCH SKIP THIS SECTION |
| | DAC | | |
| | JCN ANZ | ; | |
| | SEQ | | |
| | FIM | P7 | /SET UP STEPS |
| | | 8 | /MOVE 8 STEPS (DWN) |
| | CLB | | /CLEAR FINGER CONTROL BIT |
| | LDM | 12 | /OUTPUT −Y STEPS (1100) |
| | JUN | 2; | |
| | FOUT | | |
| / | | | |
| /PSY3 | | | /STEP UP OR DWN (1) IF DEFETCH |
| PSY3, | LD | 12 | /IF FETCH, SKIP THIS SECTION |
| | DAC | | |
| | INC | 11 | /EXTRA FIS INCR FOR FINGER CNTL BIT |
| | JCN AZ | ; | |
| | SEQ | | |
| | FIM | P7 | |
| | | 1 | |
| | CLB | | |
| | LDM | 9 | /TEST IF ARM IN (FIS=9) |
| | SUB | 11 | |
| | JCN AZ | ; | |
| | DWN | | /IF SO, MOVE UP |
| | LDM | 4 | /OUTPUT +Y STEP |
| | JUN | 2; | |
| | FOUT | | |
| DWN, | LDM | 12 | /OUTPUT −Y STEP |
| | JUN | 2; | |
| | FOUT | | |
| | | | /RLAST MOVEMENTS COMPLETE RESET |
| | | | /APPROPRIATE FLAGS |
| RLAST, | LD | 12 | /IF FETCH, EXIT HERE |
| | DAC | | |
| | JCN AZ | ; | |
| | FEXIT | | |
| | CLB | | /IF DEFETCH RESET FIS AND CONTINUE |
| | XCH | 11 | |
| | JUN | 2; | |
| | SEQ | | |
| FEXIT, | INC | 12 | /INCR SSW |
| | FIM | P7 | /CLEAR FETCH WORKING STORAGE |
| | 0 | | |
| | CLB | | /STOP ALL MOVEMENTS |
| CC690 | JUN 2; | | |
| | FOUT | | |
| | | SUBROUTINES | |
| | | | /THESE SUBROUTINES ON PAGE 0 |
| | | | /LOAD POINTERS: TO LOAD 'LAST PLAY' AND 'NEXT PLAY' POINTER INTO IR1 |
| | | | / |
| | | | /ASSUMES LAST PLAY POINTER IN REG 001 OF RD0 RAM CHIP 0 |
| | | | / |
| | | | /NEXT PLAY POINTER IN REG 001 OF RD1 RAM CHIP 0 |
| LDLP, | FIM | P0 | /SET UP TO GET 'LAST PLAY' |
| | 0 | 0 | |
| A1, | SRC | 0 | |
| | RD0 | | /GET 1ST HALF OF 'LAST PLAY' |
| | XCH | 2 | /POINTER & STORE IN IR |
| | RD1 | | /GET 2ND HALF OF 'LAST PLAY' |
| | XCH | 3 | /POINTER & STORE IN IR |
| | BBL | 0 | /RETURN |
| / | | | |

TABLE 2-continued
COMPUTER LISTING
INITIALIZATION SECTION

```
/
LDNP,     FIM      P0         /SET UP TO GET 'NEXT PLAY'
          16       0
A2,       SRC      0
          RD0                 /GET 1ST HALF OF 'NEXT PLAY'
          XCH      4          POINTER AND STORE IN IR
          RD1                 /GET 2ND HALF OF 'NEXT PLAY'
          XCH      5          POINTER & STORE IN IR
          BBL      0          /RETURN
/                             /STORE POINTERS: TO STORE 'NEXT
/                             /PLAY' AND 'LAST PLAY' POINTERS
/                             /IN REG 0 & 1 OF RD0 and RD1
/                             /OF RAM CHIP 0
/
/                             /ASSUME 'LAST PLAY' POINTER IN
                              /IR1 and 'NEXT PLAY' POINTER
                              /IN IR2
STLP,     FIM      P0         /SET UP TO STORE 'LAST PLAY'
          0        0
A3,       SRC      0
          LD       2          /LOAD 1ST HALF OF 'LAST PLAY'
          WR0                 /POINTER AND SOTRE IN RAM
          LD       3          /LOAD 2ND HALF OF 'LAST PLAY'
          WR1                 /POINTER AND STORE IN RAM
          BBL      0          /RETURN
/INCR POINTER: TO INCREMENT POINTER
                              /ASSUMES POINTER IN IR1 (2&3)
INCR,     CLC                 /CLEAR
          LDM      15         /TEST TO SEE IF POINTER
          SUB      3          /IS ON LAST RAM WORD
          JCN AZ   ;
          LAST                /JUMP IF ACC=0
          INC      3          /INCR MEMORY NUMBER
          BBL      0          /RETURN
LAST,     LD       2          /CHECK CHIP NUMBER
          JCN AZ   ;
          CPO                 /JUMP IF NOW CHIP 0
          FIM      P1         /INITIALIZE TO CHIP 0
          0        0          /MEMORY LOC 0
          BBL      0          /RETURN
CPO,      FIM      P1         /INITIALIZE TO CHIP 1
          64       0          /MEMORY LOC 0
          BBL      0          /RETURN
STNP,     FIM      P0
          16
          SRC      P0
          LD       4
          WR0
          LD       5
          WR1
          BBL
          PAUSE
                              /
                              /STORE: SAVE REG 8 IN RAM REG
                              /INDICATED BY ACC RAM LOC
                              /SPECIFIED BY IR1
                              /GET REGISTER POINTER AND
STORE,    ADD      2          /INCREMENT APPROPRIATELY
          XCH      2
          SRC      P1         /SELECT RAM
          LD       8          /LOAD DATA TO ACC
          WRM                 /AND STORE IN RAM
          SRC      P0         /SET UP FOR ANOTHER READ
          BBL      0

/COMPARE POINTERS: TO CHECK IF
                              /'LAST PLAY' POINTER EQUALS
                              /'NEXT PLAY' POINTER
                              /
                              /COMP1 ENTRY ASSUMES LAST PLAY
                              /AND NEXT PLAY POINTERS IN
                              /CORRECT REGISTERS
COMP,     JMS      ;
          LDNP                /LOAD POINTERS
          JMS      ;
          LDLP
COMP1,    CLC
          LD       2          /LOAD 1ST HALF OF 'LAST PLAY'
          SUB      4          /SUB 1ST HALF OF 'NEXT PLAY'
          JCN      4;
          EQ1                 /JUMP IF EQUAL
UNEQ,     BBL      0          /UNEQUAL RETURN
EQ1,      CLC
          LD       3          /LOAD 2ND HALF OF "LAST PLAY"
                              /POINTER
          SUB      5          /SUB 2ND HALF OF NEXT PLAY
          JCN ANZ  ;
          UNEQ                /IF NOT 0, JMP TO UNEQUAL RET
          BBL      1          /EQUAL RETURN
                              /SUBROUTINE REJECT (REJ)
                              /IF PS PLAYING, STOPS PS AND
```

TABLE 2-continued
COMPUTER LISTING
INITIALIZATION SECTION

| | | | |
|---|---|---|---|
| | | | /RESETS PS SW |
| REJ, | LD | 10 | /TEST FOR PS PLAYING |
| | RAR | | |
| | JCN CZ | ; | |
| | REJ1 | | /IF NOT, RETURN |
| | LD | 10 | /SET PLAY BIT OF PSW TO NOT PLAY |
| | DAC | | |
| | XCH | 10 | |
| | FIM | P2 | /STOP PS |
| | 17 | | /DS=1 D=1 (REJ) |
| | JMS | 2; | |
| | OUTP | | /DS=2 D=0 |
| REJ1, | BBL | | |
| | | | /SUBROUTINE TO INCR NEXT PLAY |
| | | | /POINTER (INCNP) |
| | | | /INCREMENTS NEXT PLAY POINTER |
| INCNP, | JMS | ; | |
| | LDNP | | /LOAD NEXT PLAY POINTER |
| | LD | 4 | /AND INCREMENT |
| | XCH | 2 | |
| | LD | 5 | |
| | XCH | 3 | |
| | JMS | ; | |
| | INCR | | |
| | LD | 2 | |
| | XCH | 4 | |
| | LD | 3 | |
| | XCH | 5 | |
| END0, | BBL | | |
| | | | /LOAD CURRENT FETCH X AND Y |
| | | | /ADDRESSES INTO RS0-1 |
| | | | /BOTH FINT AND DFINT USE THIS |
| | | | /SECTION |
| FETLD, | FIM | P2 | /SET UP TO WRITE X & Y ADR |
| | | 64 | |
| | FIM | P0 | /SET UP TO READ FETCH ADR REG 0-2 |
| | | 64 | |
| | LDM | 10 | /STORE TEMP |
| | XCH | 8 | |
| | CLB | | |
| | SRC | 0 | /READ HIGHEST ORDER WORD (Y ADDRESS) |
| | RD2 | | |
| | RAR | | /DIVIDE BY 2 |
| | SRC | P2 | /AND STORE IN HIGHEST PART OF Y ADR. |
| | WR0 | | |
| | INC | 0 | |
| | SRC | 0 | /GET NEXT HIGHEST WORD |
| | RD2 | | |
| | JCN CZ | ; | |
| | FETLD1 | | |
| | CLC | | |
| | ADD | 8 | /ADD 10 TO ACC IF CARRY SET |
| FETLD1, | CLC | | |
| | RAR | | /DIVIDE BY 2 WITH CARRY FROM HIGH |
| | SRC | P2 | /ORDER WORD |
| | WR1 | | /STORE IN LOW ORDER Y ADR. |
| | INC | 4 | /INCR STORE REG |
| | SRC | P2 | |
| | TCC | | /STORE CARRY ONLY IN HIGH ORDER |
| | WR0 | | /X ADR |
| | INC | 0 | |
| | SRC | 0 | |
| | RD2 | | /READ LOW ADR. WORD |
| | SRC | P2 | |
| | WR1 | | /AND STORE |
| | BBL | 0 | |
| | | | / |
| | | | /SUBROUTINE MOVE FETCH ADR TO |
| | | | /DEFETCH ADR LOCATION AND VISA- |
| | | | /VERSA CALLED BY PLAY-CUE TRANSFER |
| | | | /ALSO DISPLAYS CURRENT PLAY |
| MOVE, | FIM | P0 | /SET UP FOR REG 0, RAM 1 |
| | | 64 | |
| | LDM | 13 | /SET UP LOOP |
| | XCH | 8 | |
| | FIM | P2 | /SET UP FOR DISPLAY |
| | 208 | | |
| MO1, | SRC | 0 | |
| | RD2 | | |
| | XCH | 5 | |
| | RD3 | | |
| | WR2 | | |
| | LD | 5 | |
| | WR3 | | |
| | JMS | 2; | |

TABLE 2-continued

COMPUTER LISTING
INITIALIZATION SECTION

| | | | |
|---|---|---|---|
| | OUTP | | |
| | INC | 4 | |
| | INC | 0 | |
| | ISZ | 8; | |
| | MO1 | | |
| END1, | BBL | | |
| DISL, | LDM | 7 | /SELECT DISPLAY NUMERALS |
| | XCH | 4 | |
| | SRC | P0 | /GET MOST SIG. WORD |
| | RD0 | | /FROM APPROPRIATE RAM |
| | JMS | 2; | |
| | OUT1 | | /AND DISPLAY |
| | INC | 4 | /REPEAT FOR OTHER TWO WORDS |
| | SRC | P0 | |
| | RD1 | | |
| | JMS | 2; | |
| | OUT1 | | |
| | INC | 4 | |
| | SRC | P0 | |
| | RD2 | | |
| | JMS | 2; | |
| | OUT1 | | |
| | BBL | | /RET |
| | | | / |
| | | | /OUTP: TO OUTPUT DATA STORED IN |
| | | | /REG 5 (OR AC) IN OUTPUT DEVICE |
| | | | / SELECTED BY REG 4 |
| OUT1, | XCH | 5 | /A4, ENTRY FOR DATA IN AC |
| OUTP, | FIM | P1 | /SET UP FOR DEVICE SELECT |
| | | 48 | SELECT ROM3 |
| | SRC | P1 | |
| | LD | 4 | /SELECT DEVICE |
| | WRR | | /AND OUTPUT |
| | FIM | P1 | /SET UP FOR DATA OUTPUT |
| | | 32 | |
| | SRC | P1 | |
| | LD | 5 | /OUTPUT DATA |
| | WRR | | |
| | BBL | 0 | /RETURN |
| | PAUSE | | |
| | | | /FETCH SERVICE SUBROUTINES |
| | | | /SUBROUTINE WDC (WORD COUNT) |
| | | | /SUBROUTINE CHECKS AND DECREMENTS |
| | | | /FETCH |
| | | | / |
| | | | / |
| | | | /FETCH SERVICE SUBROUTINES |
| | | | / |
| | | | / |
| | | | /SUBROUTINE WDC |
| | | | /DECREMENTS TWO BCD NUMBERS IN P7 |
| | | | /AND RETURNS WITH ACC=1 IFB |
| WDC, | LD | 15 | /LOAD AND DECR LOW ODER ADR NUMBER |
| | JMS | 2; | |
| | TEST | | /*TI |
| | LD | 15 | /*TI |
| | JCN AZ | ; | |
| | WD1 | | |
| | DAC | | |
| | JCN AZ | ; | |
| | WD1 | | |
| | XCH | 15 | /IF NONZERO, RESTORE AND RETURN |
| | BBL | 0 | |
| WD1, | LD | 14 | /CHECK AND DECR HIGH ORDER ADR |
| | JCN AZ | ; | |
| | WD2 | | |
| | DAC | | |
| | XCH | 14 | |
| | LDM | 10 | |
| | XCH | 15 | |
| | BBL | 0 | |
| WD2, | BBL | 1 | /LAST STEP RETURN |
| | | | /SUBROUTINE LDADR(ADDRESS LOAD) |
| | | | /GET EITHER X (IF ACC=1) OR Y |
| | | | /(IF ACC=0) DECODED ADR FROM RAM |
| | | | /AND STORE IN FETCH WORKING |
| | | | /STORAGE (P7) |
| LDADR, | CLC | | |
| | FIM | P2 | |
| | | 64 | |
| | ADD | 4 | /SELECT EITHER X (REG 1) OR Y |
| | | | /(REG 0) |
| | XCH | 4 | /BASED ON ACC (0 OR 1) |
| | SRC | P2 | |

TABLE 2-continued

COMPUTER LISTING
INITIALIZATION SECTION

```
           RD0
           XCH      14
           RD1
           XCH      15
           BBL
           PAUSE
                              /
                              /SUBROUTINE GTEST
                              /DETERMINES WHETHER TO GRAB
                              OR
                              /NOT GRAB BASED ON FIS,
                              COMPLEMENTED
                              /BY SSW (LSB=1 IF FETCH, 0 IF
                              DEFETCH
GTEST,     CLB
           LD       11        /LSB=1 IF AT STORAGE STATION-IN
                              /OR AT PLAY STATION-OUT
           ADD      12        /COMPLEMENT LSB IF FETCH
           RAR                /ISOLATE LSB AND STORE TEMP IN
                              CY
           CMC                /COMPLEMENT CY
           BBL                /
                              /SECTION TO OUTPUT DATA IN ACC
                              /TO FETCH CNTROL LATCH (LATCH
                              E)
FOUT,      XCH      8         /STORE TEMP
           TCC                /TRANSFER CARRY(FINGER
                              CONTROL)
           ADD      8         /ADD MOTOR CONTROL
           XCH      5         /STORE FOR OUTPUT
           LDM      4         /SELECT OUTPUT DEVICE 4
           XCH      4         /(CATCH E)
           LD       5         /*TI
           JMS      2;
           TEST               /*TI
           JMS      2;
           OUTP               /AND OUTPUT
END2,      BBL
```

We claim:

1. A system for storing and retrieving information contained within discrete information-bearing modules, comprising:
   a. a fixed storage area for storing a plurality of discrete information-bearing modules in a two-dimensional array, each of said modules having a designated location within said array;
   b. a fixed processing station remotely situated from said fixed storage area for extracting information from individual modules;
   c. a movable selection mechanism having three degrees of freedom for retrieving an individual module from said storage area and for transferring it to said fixed processing station and for restoring the same to its designated position within said storage area after information has been extracted therefrom;
   d. memory means remote from said storage area for storing a predetermined schedule of modules to be sequenced through said fixed processing station;
   e. input means for enabling said predetermined schedule of modules to be entered in said memory means;
   f. means for automatically controlling said selection mechanism to sequentially retrieve, process and restore modules according to said fixed predetermined schedule stored in said memory means; and
   g. additional means for initializing each information-bearing module before next being processed at said fixed processing station.

2. A system as in claim 1 wherein said automatic control means operates to sequence said modules on the basis of the first module entered in said memory means is the first module sequenced.

3. A system as in claim 1 wherein said storage area comprises a generally cylindrical volume having an open central core along the axis thereof for accepting said selection mechanism, and having a plurality of compartments therein for storing modules, said compartments being accessible by said selection mechanism for retrieving and restoring said modules.

4. A system as in claim 3 wherein said selection mechanism includes a gripping mechanism for selectively engaging a module and includes means for moving said gripping mechanism along the axis of said cylinder, for rotating said gripping mechanism about said axis, and for moving said gripping mechanism radially of said axis to retrieve or restore a selected module.

5. A system as in claim 1 wherein said modules comprise magnetic tape cassettes and wherein said processing station includes a magnetic tape pick-up assembly.

6. A system as in claim 5 wherein said input means comprises a keyboard.

7. A system as in claim 1 wherein said storage area comprises a generally rectilinear volume having a plurality of compartments therein for storing modules, said compartments being accessible by said selection mechanism for retrieving and restoring said modules.

8. A system as in claim 1 wherein said automatic controlling means includes means for automatically shutting down the system after said predetermined schedule has been completed.

9. A system for storing and retrieving information contained within discrete information-bearing modules, comprising:
   a. a fixed storage area for storing a plurality of discrete information-bearing modules in a two-dimensional array, each of said modules having a designated location within said array;

b. a fixed processing station remotely situated from said fixed storage area for extracting information from individual modules;

c. a fixed pre-processing station remotely situated from said storage area;

d. means for transferring a module within said pre-processing station to said processing station and returning the module back to said pre-processing station after information has been extracted therefrom; and e. a selection mechanism having three degrees of freedom for retrieving an individual module from said storage area and for transferring it to said preprocessing station and for restoring the same to its designated position within said storage area after it has been returned to said pre-processing station.

10. A system as in claim 9 including:

a. memory means remote from said storage area for storing a predetermined schedule of modules to be sequenced through said fixed processing station;

b. input means for enabling siad predetermined schedule of modules to be entered in said memory means; and c. means for automatically controlling said selection mechanism to sequentially retrieve, process and restore modules according to said predetermined schedule stored in said memory means.

11. A system as in claim 10 wherein said memory means additionally includes means for storing intra-module addresses to selected portions within a given module, said input means including means for enabling said intra-module addresses to be entered in said memory means, and wherein said pre-processing station includes means for cuing up said selected portions, if any, for each module prior to being transferred to said processing station, whereby the overall access time of the system is reduced.

12. A system as in claim 11 wherein the information is stored linearly within said modules and wherein said cuing means cycles through said linearly stored information until it locates the addressed selected portion.

13. A system as in claim 12 wherein said pre-processing station additionally includes means for de-cuing a module after returning from said processing station whereby said module is returned to its normal storage state.

14. A system as in claim 11 wherein said pre-processing station additionally includes means for de-cuing a module after returning from said processing station whereby said module is returned to its normal storage state.

15. A system as in claim 12 wherein said automatic control means operates to sequence said modules on the basis of the first module entered in said memory means is the first module sequenced.

16. A system as in claim 12 wherein said storage area comprises a generally cyclindrical volume having an open central core along the axis thereof for accepting said selection mechanism, and having a plurality of compartments therein for storing modules, said compartments being accessible by said selection mechanism for retrieving and restoring said modules.

17. A system as in claim 14 wherein said selection mechanism includes a gripping mechanism for selectively engaging a module and includes means for moving said gripping mechanism along the axis of said cylinder, for rotating said gripping mechanism about said axis, and for moving said gripping mechanism radially of said axis to retrieve or restore a selected module.

18. A system as in claim 13 wherein said modules comprise magnetic tape cassettes and wherein said processing station includes a magnetic tape pick-up assembly.

19. A system as in claim 18 wherein said input means comprises a keyboard.

20. A system as in claim 12 wherein said storage area comprises a generally rectilinear volume having a plurality of compartments therein for storing modules, said compartments being accessible by said selection mechanism for retrieving and restoring said modules.

21. A system as in claim 10 wherein said automatic controlling means includes means for automatically shutting down the system after said predetermined schedule has been completed.

22. A system as in claim 18 wherein said intra-module addresses comprise identification of non-recorded blanks between recordings on said magnetic tape.

23. A system as in claim 11 wherein said intra-module addresses comprise identification of non-recorded blanks between recordings on said magnetic tape.

* * * * *

UNITED STATES PATENT AND TRADEMARK OFFICE
CERTIFICATE OF CORRECTION

PATENT NO. : 3,938,190
DATED : February 10, 1976
INVENTOR(S) : John Leonard Semmlow and Lawrence Stark It is certified that error appears in the above-identified patent and that said Letters Patent are hereby corrected as shown below:

Column 6, lines 43-44, add quotation marks around power-clear.

Column 9, line 58, delete "conplete" and insert --complete--.

Column 10, line 1, add quotation marks around same cassette.

Column 10, line 15, add quotation marks around 1st cycle.

Column 10, line 17, add quotation marks around 1st cycle.

Column 10, line 22, add quotation marks around last cycle.

Column 10, line 25, add quotation marks around last cycle.

Column 10, line 26, add quotation marks around 1st cycle.

Column 10, line 47, delete "CC-699" and insert --CC-690--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*